United States Patent [19]

Yanagawa et al.

[11] Patent Number: 6,154,332
[45] Date of Patent: Nov. 28, 2000

[54] SYSTEM FOR RECORDING AND REPRODUCING DATA HAVING SCHEME FOR MINIMIZING VARIATION IN RECORD TRACK WIDTH WHEN RECORDING AT DIFFERENT DATA RATES

[75] Inventors: Yoshifumi Yanagawa, Kyoto; Tadashi Kunihira, Osaka; Masahiro Motosugi, Katano; Katsumi Gotoh, Katano, all of Japan

[73] Assignee: Matsushita Electric Industrial Co., Ltd., Osaka-fu, Japan

[21] Appl. No.: 09/186,788

[22] Filed: Nov. 5, 1998

Related U.S. Application Data

[62] Division of application No. 08/612,353, Mar. 7, 1996, Pat. No. 6,014,278.

[30] Foreign Application Priority Data

Mar. 7, 1995 [JP] Japan .................... 7-046972
Mar. 13, 1995 [JP] Japan .................... 7-052559
Apr. 21, 1995 [JP] Japan .................... 7-096400

[51] Int. Cl.$^7$ ........................................ G11B 15/14
[52] U.S. Cl. ............................... 360/64; 360/73.06
[58] Field of Search ............................. 360/64, 62, 107, 360/71, 73.01, 73.04, 77.12, 77.13, 72.1, 73.06, 61, 8, 48; 386/75, 81, 68, 69, 72, 74, 124, 92, 108

[56] References Cited

U.S. PATENT DOCUMENTS

| | | | |
|---|---|---|---|
| 4,853,803 | 8/1989 | Fukatsu et al. | 360/72.2 |
| 4,920,435 | 4/1990 | Yamazaki | 360/77.15 |
| 4,930,031 | 5/1990 | Nagahara et al. | 360/107 |
| 4,942,487 | 7/1990 | Noguchi et al. | 360/77.13 |
| 5,432,648 | 7/1995 | Watanabe et al. | 386/72 |
| 5,576,907 | 11/1996 | Hasegawa | 360/64 |
| 5,585,973 | 12/1996 | Kim | 350/64 X |
| 5,625,504 | 4/1997 | Okada et al. | 360/27 |
| 5,661,845 | 8/1997 | Sugiyama | 386/45 |
| 5,677,803 | 10/1997 | Ozue et al. | 360/64 X |
| 5,684,649 | 11/1997 | Ozue | 360/64 |
| 5,790,746 | 8/1998 | Kashida et al. | 360/64 X |
| 5,825,971 | 10/1998 | Inoue et al. | 360/64 X |

FOREIGN PATENT DOCUMENTS

| | | |
|---|---|---|
| 581307 | 2/1994 | European Pat. Off. . |
| 3808198 | 9/1988 | Germany . |
| 43282651 | 3/1995 | Germany . |
| 1-166374 | 6/1989 | Japan . |
| 2-94071 | 4/1990 | Japan . |
| 6-261278 | 9/1994 | Japan . |
| WO 93/26005 | 12/1993 | WIPO . |

OTHER PUBLICATIONS

Augenbraun, J.E., "Strategies For Multi–Rate Recording For A Consumer Digital VCR", *IEEE Transaction On Consumer Electronics*, vol. 40, No. 3, Aug. 1994, pp. 163–168.
Hedtke, R. "Experimental, 1.2–Gbit/s Digital Cassette Recorder for High–Definition Television", *Journal of Electronic Imaging*, vol. 2, No. 1, Jan. 2, 1993, pp. 44–52.
Abstract of DE 3808198, Noguchi, Sep. 1988.
Abstract of DE 4328265, Schiffler, Mar. 1995.

*Primary Examiner*—Andrew L. Sniezek
*Attorney, Agent, or Firm*—Akin, Gump, Strauss, Hauer & Feld, L.L.P.

[57] ABSTRACT

At least three heads are mounted on a rotary drum. Between the first and third heads which are located in close proximity to each other and have different azimuth angles, an intentionally provided minute height difference is formed in the rotation shaft direction of the rotary drum. Signals of a plurality of data rates are recorded and reproduced by using the first and second heads or the first and third heads. Two heads having the same azimuth angle are disposed on the rotary drum so as to be opposed each other at a central angle of 180°. In search speed reproduction, search data are reproduced by the two heads. Tracks are divided in the unit of plural tracks so as to form track sets. Search data areas of each track set are disposed at a position of each track which is separated from the edge of a tape by a predetermined distance. In search speed reproduction, the phases of the tracks and the heads are controlled, and all effective data of the search data areas are reproduced by plural scans of the heads.

8 Claims, 28 Drawing Sheets

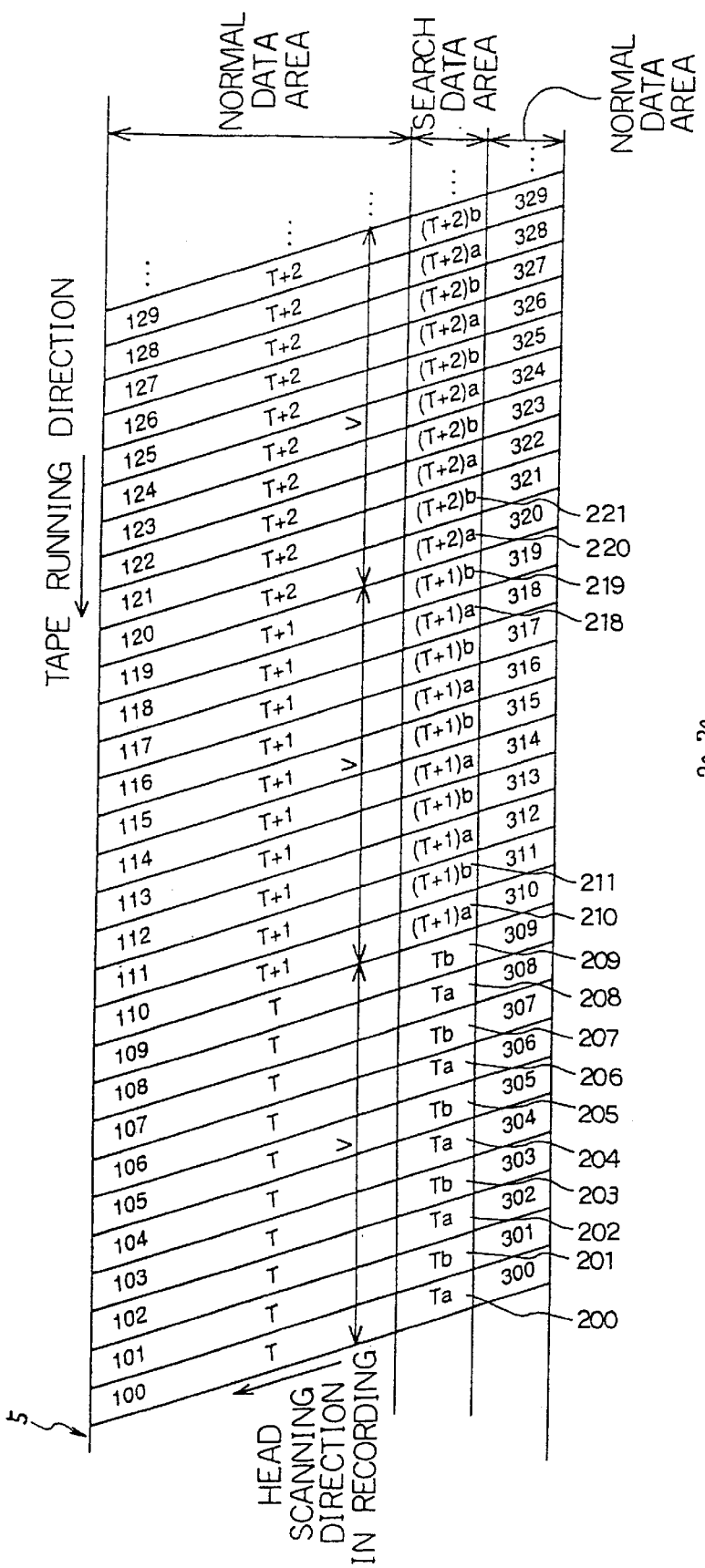
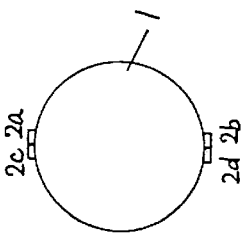
FIG. 19A
FIG. 19B

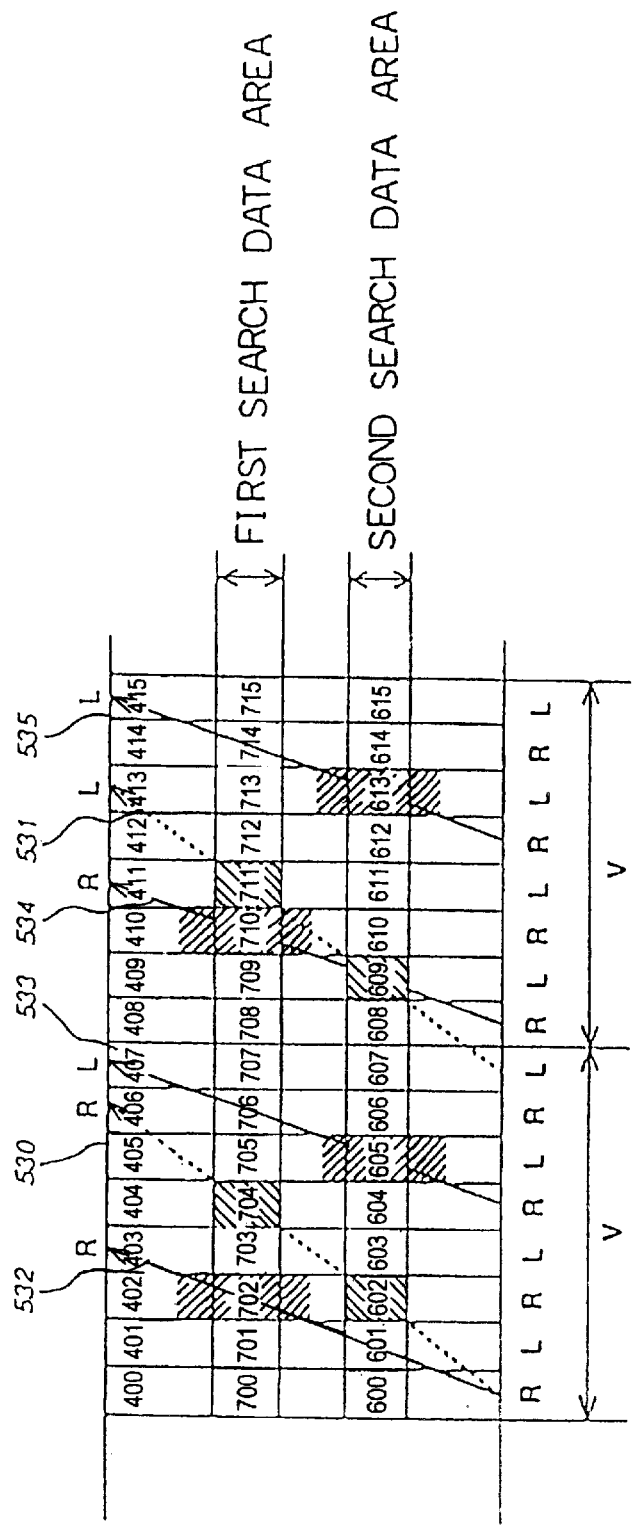
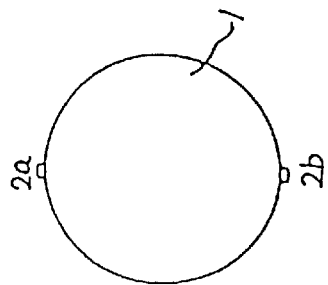
FIG. 25A
FIG. 25B

SYSTEM FOR RECORDING AND REPRODUCING DATA HAVING SCHEME FOR MINIMIZING VARIATION IN RECORD TRACK WIDTH WHEN RECORDING AT DIFFERENT DATA RATES

CROSS REFERENCE TO RELATED APPLICATION

This application is a division of application Ser. No. 08/612,353, filed Mar. 7, 1996, now U.S. Pat. No. 6,014,278, originally entitled "METHOD AND APPARATUS FOR RECORDING AND REPRODUCING DATA" the entire disclosure of which is incorporated herein by reference.

FIELD OF THE INVENTION AND RELATED ART STATEMENT

1. Field of the Invention

The present invention relates to a recording or reproducing apparatus of the rotary head type which can magnetically record a digital signal, and more particularly to a digital VCR (Video Cassette Recorder) which can record and reproduce plural signals of different data rates and surely reproduce data even when data are searched at a high speed.

2. Description of the Related Art

Conventionally, as a method of recording and reproducing plural signals of different data rates in a VCR, known is a method which is described in a publication of IEEE Transactions on Consumer Electronics, Vol. 40, No. 3, P. 263–268. This publication shows a technique of conducting multirate recording in a digital VCR without changing a recording density.

In the method, two heads of different azimuth angles are mounted on a rotary drum so as to be opposed to each other at a central angle of 180°. These heads are called a first head and a second head, respectively. When the rotary drum rotates, the first and second heads alternately scan a tape. Hereinafter, the description is made only on the recording operation. The reproducing operation is conducted in the same manner.

In normal record and reproduction (1-speed record and reproduction) in which an image is recorded and reproduced at a normal speed, a magnetic tape (hereinafter, referred to as merely "tape") is caused to run at a predetermined speed (1-speed). First, the first head scans the tape, and the second tape then scans the tape so that signals are sequentially recorded.

In the ⅓-speed record and reproduction mode (⅓-speed record and reproduction) in which the rate of data to be recorded is one third that of the normal record and reproduction, the tape speed is reduced to ⅓. First, the first head scans the tape and records a signal. Next, the second head scans the tape and the first head then conducts the second scan. In the scan of the second head and the second scan of the first head, a signal is not recorded. When the second head then scans the tape, a signal is recorded. Similarly, when the first and second heads then scan the tape in sequence, a signal is not recorded. In the next scan of the first head, a signal is recorded. Then, the operation state returns to the initial state. The recording at the ⅓-data rate is conducted by repeating the above operation. In a similar manner, a signal can be recorded and reproduced at a 1/n-data rate (where n is a positive odd number).

In addition to the configuration, a third head of an azimuth angle which is different from that of the first head may be colocated or placed at the same position so that, even when n is an even number, record and reproduction are enabled. Since the first and third heads are colocated, the scan operations conducted by the two heads are substantially coincident with each other.

When a signal of the data rate which is one half that of the normal record and reproduction is to be recorded and reproduced, for example, record and reproduction are conducted in the following manner. First, the tape speed is reduced to one half that of normal speed reproduction. When the first and third heads scan the tape, the first head conducts the signal recording but the third head does not conduct it. When the first and third heads scan the tape at the next time, the third head conducts signal record but the first head does not conduct it. Signal record at the ½-fold data rate is conducted by repeating the operation.

Even when n is a positive even number, signals can be generally recorded and reproduced at a 1/n-fold data rate in a similar manner.

In such a prior art recording and reproducing apparatus, the first and third heads are to be colocated.

Actually, however, it is difficult to dispose two heads at the same position, and hence the two heads are located at positions which are close to each other, respectively.

However, a prior art magnetic recording and reproducing apparatus is not provided with a measure against a problem which may be produced by the close arrangement of two heads. As a result, there arise problems in that the track width varies because the tape speed is changed in record modes of different data rates, and that the tracking margin which is tolerance for deviation of a head is reduced in search speed reproduction in which reproduction is conducted at a speed different from the normal one.

Conventionally, as a method of conducting search speed reproduction in a digital VCR, known is a method disclosed in Japanese Patent Publication (Kokai) No. HEI 2-94071.

In the disclosed method, when a video signal is to be recorded, a subcode area is formed on a tape. The subcode area is formed on the scanning locus of a head which is to be produced in search speed reproduction, and still image information extracted from the video signal is recorded in the subcode area in a distributed manner. In search speed reproduction, data recorded in the subcode area are reproduced so as to reproduce the still image information, thereby improving the image quality of variable speed reproduction.

In such a configuration, however, a speed at which still image information can be stably reproduced in search speed reproduction is restricted only to one kind. In a VCR at present, a speed of one kind is not sufficient for search speed reproduction. According to the prior art method, in order to cope with plural variable reproduction speeds, data must be recorded in a duplicate manner on all the scanning loci of heads which are to be produced in the plural variable reproduction speeds. This produces problems in that duplication of data is required so that reproduction of data is complicated, and that data are wasted.

In the prior art method, the record track must be made positionally coincident with the heads. Furthermore, the track in which the subcode area is formed must be selected in search speed reproduction, thereby producing a problem in that the mode shift from normal speed reproduction in which an image is reproduced at the normal speed to search speed reproduction requires a prolonged time period. In the prior art method, there is a further problem in that an AUX area in which additional information such as a program is to be recorded is disposed in the normal data area and hence information of the AUX area cannot be reproduced in search speed reproduction.

OBJECT AND SUMMARY OF THE INVENTION

It is an object of the present invention to suppress the variation in track width when plural signals of different data rates are recorded.

It is another object of the invention to reduce the failure in obtaining search information and surely reproduce search data in search speed reproduction.

The present invention is to easily realize search speed reproduction of a high image quality in a simple data arrangement.

The present invention is to reduce wasted search data and realize search speed reproduction of plural speeds.

The present invention is to provide a recording and reproducing apparatus which can surely reproduce search data even when the phase indicative of positional deviation between a head and a record track is not controlled in search speed reproduction.

The present invention is to provide a recording and reproducing apparatus in which it is not required to select a track to be scanned in search speed reproduction and the mode can be smoothly shifted from normal speed reproduction to search speed reproduction.

The present invention is to provide a recording and reproducing apparatus in which even a head of a width substantially equal to a track pitch can reproduce all effective search data.

The present invention is to provide a recording and reproducing apparatus which can reproduce information of an AUX area also in search speed reproduction.

In order to attain the objects, the recording and reproducing apparatus of the invention comprises: tape driving means for driving a tape; a rotary drum around which the tape is to be slantly wound; three heads, first, second, and third heads which are mounted on the rotary drum and which scan the tape so as to conduct recording or reproducing operation; and a head control unit which controls the operations of the three heads. The azimuth angles of the three heads are set so that the first head has a first azimuth angle and the second and third heads have a second azimuth angle which is different from the first azimuth angle. The three heads have mutual positional relationships in which the first and second heads are mounted on the rotary drum so as to be opposed each other at a central angle of 180° and at the same height, in the rotation shaft direction of the rotary drum, and the third head is located in close proximity to the first head in the circumferential direction of the rotary drum with a minute difference in central angle and a minute height difference in the rotation shaft direction of the rotary drum.

According to this configuration, the minute height difference is set between the first and third heads which are disposed in close proximity to each other. When plural signals of different data rates are to be recorded or reproduced, therefore, the head scan error can be reduced and the variation in record track width can be minimized.

In order to attain the objects, the apparatus of the invention comprises a rotary drum around which a tape is to be slantly wound, and three heads, first, second, and third heads which are mounted on the rotary drum and scan the tape so as to conduct recording or reproducing operation. The azimuth angles of the three heads are set so that the first head has a first azimuth angle and the second and third heads have a second azimuth angle which is different from the first azimuth angle. The three heads have mutual positional relationships in which the second and third heads are mounted on the rotary drum so as to be opposed each other at a central angle of 180 deg. and the first head is located in close proximity to the third head in the circumferential direction of the rotary drum with a minute difference in central angle.

According to this configuration, since the second and third heads having the same azimuth angle (the second azimuth angle) are located at positions which are opposed to each other at a central angle of 180°, the deviation amount in scan position of the heads in search can be reduced and made always constant irrespective of the search speed. Even in a high speed search, therefore, search data can be surely reproduced.

In order to attain the objects, a plurality of heads having at least one azimuth angle are disposed. A normal data area used in normal speed reproduction which is reproduction conducted at the normal speed, and one or more search data areas used in search speed reproduction are disposed in one track. The reference speed for search speed reproduction which is a speed serving as the reference for search speed reproduction is set to be $N_1$ [$N_1$-speed] (where $N_1$ is an odd number). The search data areas of a track set consisting of $N_1$ or more tracks which are alternately selected are disposed at positions of the respective tracks and on the same line parallel to the tape running direction. The same data are recorded in the search data areas of the track set.

According to this configuration, each of the plurality of heads scans one time the track set, and hence it is not required to select the track to be selected. Even when the positional relationships between the heads and record tracks are not controlled, moreover, data can be complementarily reproduced by plural scans or all effective data of the search data areas can be reproduced by either of plural scans. Therefore, search speed reproduction of a high image quality can be realized in a simple data arrangement.

In order to attain the objects, a normal data area which is used in normal speed reproduction, and one or more search data areas which are used in search speed reproduction are disposed in one track. The reference speed for search speed reproduction is set. The search data areas of a track set consisting of a plurality of tracks are disposed at positions on the same line parallel to the tape running direction on the respective tracks. The search data areas of the track set have the same data. In reproduction at the reference speed for search speed reproduction, the positional relationships between tracks and the heads are controlled, and data of the search data areas of the track set are reproduced by two scans of the heads.

According to this configuration, the heads scan the search data areas two times in complementary positional relationships and hence all effective data of the search data areas can be complementarily reproduced. Therefore, it is not required to select a track to be scanned so that even heads which have the width substantially equal to the track pitch or a small tracking margin can realize search speed reproduction of a high image quality.

In order to attain the objects, when reproduction is to be conducted at a reproduction speed which is about two times the reference speed for search speed reproduction, a search data area is formed on a locus along which a head scans a tape, and, when reproduction is to be conducted at the reference speed for search speed reproduction, data of the search data area are reproduced by two scans of the head.

According to this configuration, even when a track to be scanned is not selected, reproduction can be conducted at the reference speed for search speed reproduction and a speed which is about two times the reference speed. Furthermore, all search data can be reproduced by heads which have the width substantially equal to the track pitch. As a result, the same data are commonly used in reproductions of different speeds, and hence it is possible to realize search speed reproductions of different speeds in which search data are not duplicately used.

In order to attain the objects, a normal data area which is used in normal speed reproduction, and one or more search data areas which are used in search speed reproduction are disposed in one track. The search data areas of a track set consisting of a plurality of tracks which are alternately selected are disposed at positions on the same line of the respective tracks. The same data are recorded in the search data areas of the track set. Data of the search data areas are reproduced by W scans (where W is an integer which is 3 or more).

According to this configuration, even when heads which have the width substantially equal to the track pitch are used in search speed reproduction, all effective data of the search data areas can be reproduced by W scans without requiring the control of the positional relationships between the heads and record tracks. Consequently, search speed reproduction of plural speeds in which wasted search data are reduced can be realized.

In order to attain the objects, a normal data area which is used in normal speed reproduction, and one or more search data areas which are used in search speed reproduction are disposed in one track. The search data areas of a track set consisting of a plurality of tracks which are alternately selected are disposed at positions on the same line parallel to the tape running direction on the respective tracks. The same data are recorded in the search data areas of the track set. The delimitation of the track set is indicated by the control signal.

According to this configuration, the detection of a track set can be simplified and it is not required to record data indicative of the delimitation of a track set, whereby search speed reproduction of a high image quality can be easily realized.

In order to attain the objects, a normal data area which is used in normal speed reproduction, and one or more search data areas which are used in search speed reproduction are disposed in one track. An AUX area is formed in a part of the search data areas.

According to this configuration, data recorded in the AUX area can be reproduced in both normal speed reproduction and search speed reproduction.

BRIEF DESCRIPTION OF THE DRAWINGS

FIG. 19A is a plan view of a tape showing the track pattern in the fourth embodiment of the invention in the case where search data areas are disposed in tracks of R- and L-azimuth angles;

FIG. 19B is a plan view of the rotary drum showing the head arrangement in the fourth embodiment of the invention in the case where search data areas are disposed in tracks of R- and L-azimuth angles;

FIG. 25A is a plan view of a tape showing the track pattern in the sixth embodiment of the invention in the case where search data areas are disposed in tracks of R- and L-azimuth angles;

FIG. 25B is a plan view of the rotary drum showing the head arrangement in the sixth embodiment of the invention in the case where search data areas are disposed in tracks of R- and L-azimuth angles;

DESCRIPTION OF THE PREFERRED EMBODIMENT

The present invention will be described in detail below with reference to the accompanying drawings.

First Embodiment

A first embodiment of the present invention will be described with reference to FIG. 1–FIG. 7.

Hereinafter, a first embodiment of the invention will be described with reference to FIGS. 1 to 7.

A mode in which record or reproduction is conducted at the reference tape speed (1-speed) is as a standard mode, and the data rate of input and output in the standard mode is defined as the reference data rate. A mode in which record or reproduction is conducted at a tape speed which is one N-th the reference tape speed is defined as an N-fold long-recording-time mode (where N is a positive integer).

Figure 1:
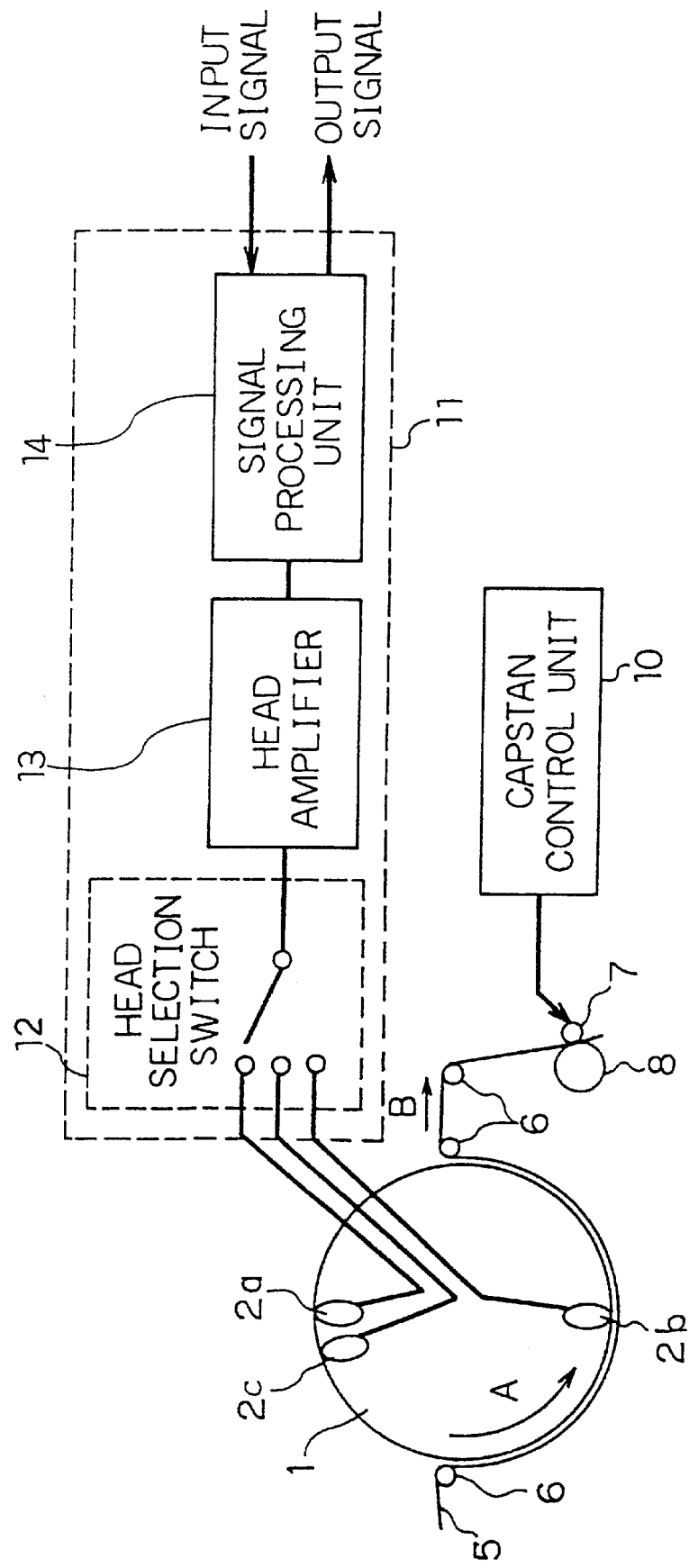
FIG. 1 is a block diagram of a recording and reproducing apparatus of a first embodiment of the invention.
Figure 2:
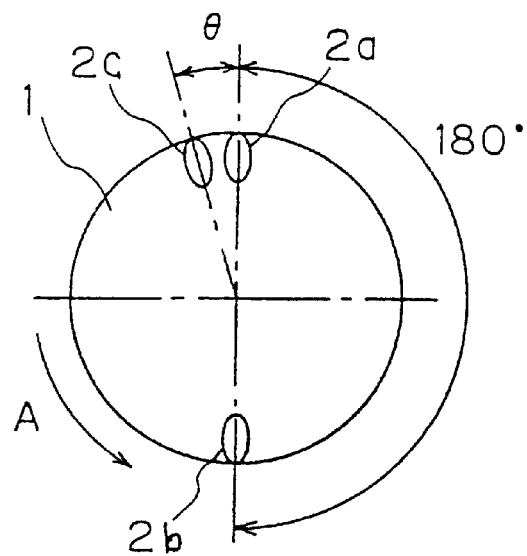
FIG. 2 is a plan view of a rotary drum showing the head arrangement in the first embodiment of the invention.
Figure 3:
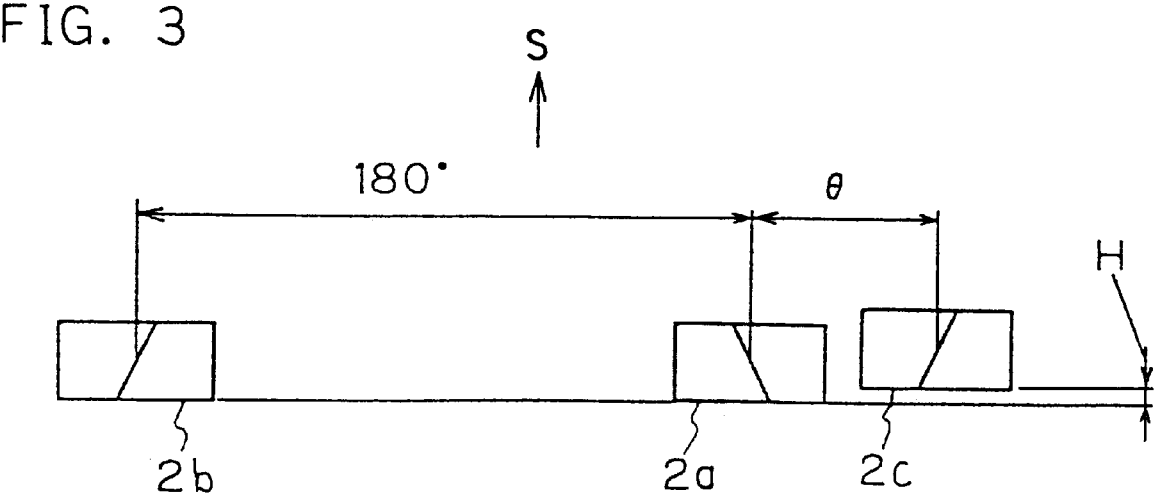
FIG. 3 is a diagram showing a height difference of heads mounted in the first embodiment of the invention.

The first embodiment of the invention has the following configuration. FIG. 1 is a block diagram, FIG. 2 is a plan view of a rotary drum showing the head arrangement, and FIG. 3 is a diagram showing a height difference of heads. In FIG. 3, the arrow S indicates the upward direction in the rotation shaft direction of the rotary drum 1.

A first head 2a, a second head 2b, and a third head 2c are mounted on the circumference of the rotary drum 1. The heads 2a and 2c are mounted in close proximity to each other. The head 2c leads the head 2a by a central angle θ in the rotation direction A of the rotary drum 1. The head 2c is attached at a position which is higher than the head 2a by a minute height difference H. The heads 2a and 2b have a mutual positional relationship in which they are opposed to each other at a central angle of 180° and are equal in height to each other. The heads 2b and 2c have the same azimuth angle, and the head 2a has an azimuth angle which is different from those of the heads 2b and 2c. Accordingly, it is assumed that the head 2a has the L-azimuth angle and the heads 2b and 2c have the R-azimuth angle.

Figure 4:
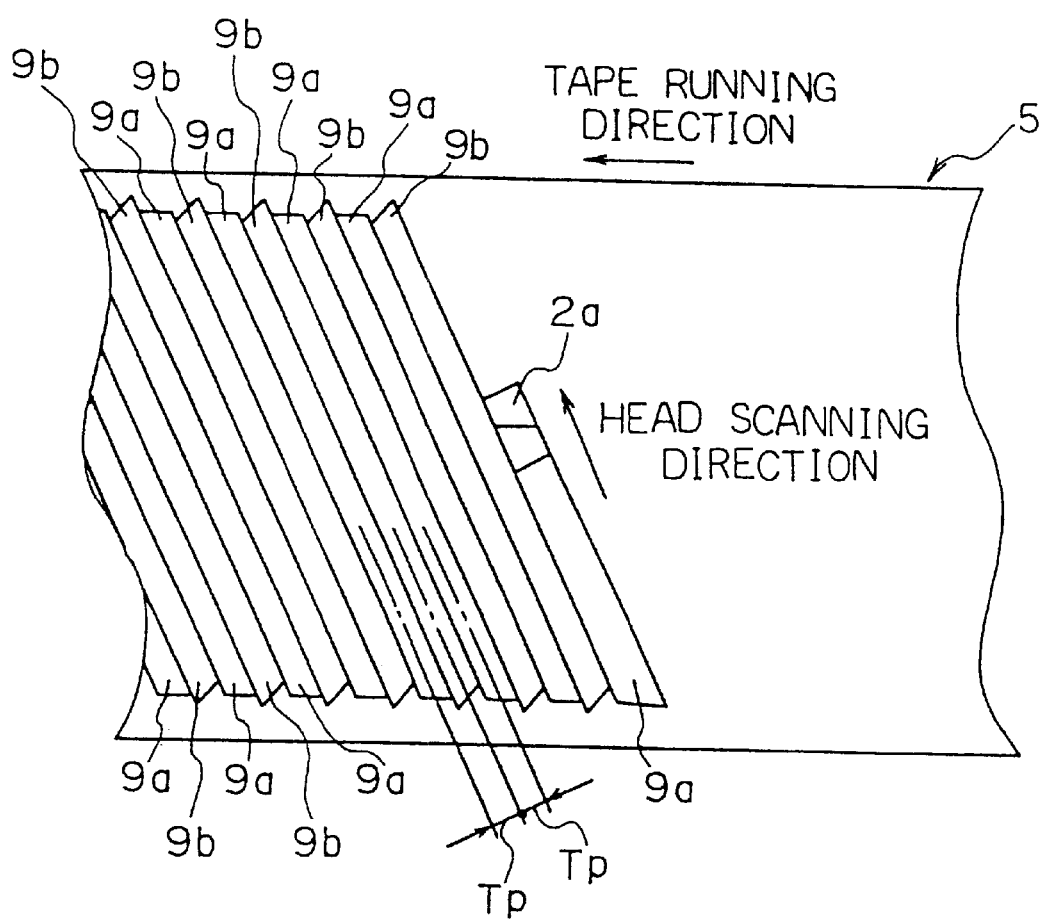
FIG. 4 is a track pattern diagram of a magnetic tape.
Figure 5:
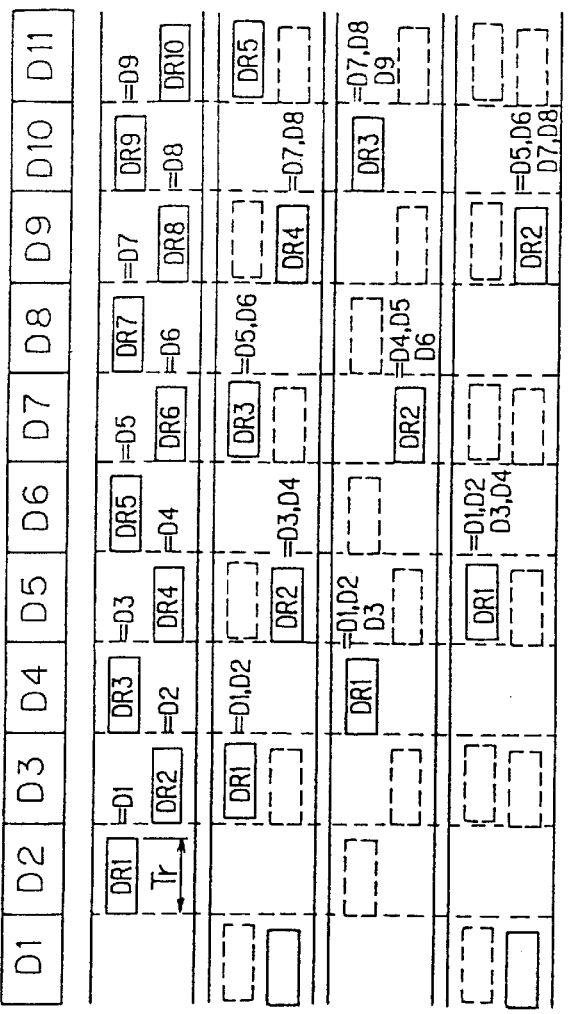
FIG. 5A is a time chart of input signals in the first embodiment of the invention.
FIG. 5B is a time chart of the recording operation conducted when N=1 in the first embodiment of the invention.
FIG. 5C is a time chart of the recording operation conducted when N=2 in the first embodiment of the invention.
FIG. 5D is a time chart of the recording operation conducted when N=3 in the first embodiment of the invention.
FIG. 5E is a time chart of the recording operation conducted when N=4 in the first embodiment of the invention.

A tape 5 is caused by a plurality of tape guides 6 to be slantly wound around the rotary drum 1 over a central angle of about 180°, and driven by a capstan 7 and a pinch roller 8 so as to run over the rotary drum. When the rotary drum 1 rotates, the heads 2a, 2b, and 2c slantly scan the tape 5 and record or reproduce tracks 9a and 9b on the tape 5. FIG. 4 shows the manner of recording the track 9a by the head 2a. In the embodiment, the rotation angle or effective winding angle of the rotary drum 1 for forming the tracks 9a and 9b is, for example, a central angle of 174°.

The rotation speed of the capstan 7 is controlled by a capstan control unit 10 so that the tape running speed in record and reproduction is maintained to be one N-th the reference tape speed. The reference tape speed is a speed at which the head scan position is deviated in the track width direction by two track pitches 2Tp during a period when the rotary drum 1 makes one revolution. When the rotary drum 1 makes one half revolution, the head scan position is deviated by one track pitch 1Tp. In record and reproduction (other than search), the revolution number of the rotary drum 1 is constant irrespective of the value of N. A head control unit 11 controls the timing of record and reproduction and comprises a head selection switch 12, a head amplifier 13, and a signal processing unit 14.

The signal processing unit 14 adds synchronization information, ID information (synchronization block number, etc.), a header, an error correcting code, and the like to an input signal 15, thereby producing original record data. The original record data are time-base-compressed into data for each track. The data are amplified by the head amplifier 13 and then divided among the heads 2a, 2b, and 2c by the head selection switch 12. Similarly, reproduced signals from the heads 2a, 2b, and 2c are supplied to the head amplifier 13 through the head selection switch 12 and then transmitted to the signal processing unit 14. The signal processing unit 14 conducts processes such as time-base-expansion of the reproduced signals, removal of information added in recording operation, and error correction and restores the signals to the original data.

In the thus-configured recording and reproducing apparatus, the operation in the N-fold long-recording-time mode will be described.

When the revolution number of the rotary drum 1 is represented by r(revolutions/second) and the time period required for the rotary drum 1 to make one half revolution is represented by τ (seconds), the relationship of τ=½r is established. The time period required for each head to scan one track is indicated by Tr. In this example, since one track is formed by rotating the rotary drum by 174°, the time period Tr is 174τ/180 (seconds).

For the sake of description, as shown in FIG. 5A, the original record data are divided every τ seconds so as to be indicated as data blocks D1, D2, . . . . When the magnification N is 1 or the standard mode is set, one data block is used as data for one track.

In the N-fold long-recording-time mode, N data blocks are recorded in one track.

The amount of data which are to be recorded in one track 9 is constant irrespective of the magnification N. The amount of data included in one data block in the N-fold long-recording-time mode is one N-th that of data included in one data block in the standard mode. Consequently, the data rate in the N-fold long-recording-time mode is the reciprocal of the magnification N in the standard mode.

The signal processing unit 14 conducts the data conversion processing on the input signal 15. First, the input signal 15 is subjected to processes such as addition of an error correcting code and original record data blocks D1, D2, . . . are produced. The original record data are combined in the unit of N data blocks and time-base-compressed so that record data for one track DR1, DR2, . . . are sequentially produced. Since each set of the record data contains original record data for N data blocks, record data for one track are produced for a time period Nτ. The record data are recorded into one track 9 for each time period Nτ. In the above, τ indicates the time period required for the rotary drum 1 to make one half revolution. Consequently, one track 9 is recorded for every N/2 revolutions. Since the tape speed is one N-th the reference tape speed, the head scan position is deviated by Tp/N as a result of one half revolution of the rotary drum 1 and by 2Tp/N as a result of one revolution. Namely, the head scan position is deviated by one track pitch 1Tp as a result of N/2 revolutions of the rotary drum 1. When record is conducted for every N/2 revolutions, therefore, it is possible to obtain a normal track pattern.

In the azimuth record, heads of different azimuth angles or L- and R-azimuth angles alternately conduct record or reproduction. When the magnification N is an odd number, record is conducted for every N/2 revolutions and hence the heads 2a and 2b which are opposed to each other at a central angle of 180° on the rotary drum 1 are used. When the magnification N is an even number, N/2 is an integer. Strictly speaking, therefore, heads which are at the same position on the rotary drum 1 must be used. In order to conduct the azimuth record, however, the heads 2a and 2c which are in close proximity to each other are used.

When the magnification N is an odd number, the head selection switch 12 switches over the connections between the head amplifier 13 and the heads 2a and 2b for every N/2 revolutions of the rotary drum 1, and is closed only for a time period Tr when each of the heads 2a and 2b scans the tape 5 so as to connect the head 2a or 2b to the head amplifier 13. When the magnification N is an even number, the head selection switch 12 switches over the connections between the head amplifier 13 and the heads 2a and 2c for every N/2 revolutions of the rotary drum 1, and is closed only for a time period Tr when each of the heads 2a and 2c scans the tape 5 so as to connect the head 2a or 2c. In accordance with the switching operation of the head selection switch 12, the signal processing unit 14 outputs the record data DR1, DR2, . . . in sequence. The record data DR1, DR2, . . . are amplified by the head amplifier 13 and then recorded onto the tape 5 by the head 2a, 2b, or 2c.

As a result of the recording operation described above, the record in the N-fold long-recording-time mode can be conducted at a speed which is one N-th the reference tape speed. At this time, the data rate is one N-th the reference data rate.

In reproduction, the head selection switch 12 operates in the same manner as the case of record. Signals reproduced in the head unit are amplified by the head amplifier 13, subjected to processes such as error correction in the signal processing unit 14, and then time-base-expanded to data of N×τ seconds so as to be restored to the original data blocks D1, D2, . . . .

As described above, in the N-fold long-recording-time mode, signals can be recorded or reproduced at the data rate of 1/N. Also in the standard mode (N=1), record and reproduction are conducted in a similar manner.

These operations will be described specifically in the cases wherein record is conducted in the magnification N=1, 2, 3, or 4, with reference to the accompanying drawings.

FIG. 5A shows the original record data which are partitioned at intervals of τ seconds and in the form of the data blocks D1, D2, . . . . In FIGS. 5B to 5E, boxes indicated by broken lines show periods when data are nor recorded.

FIG. 5B shows the recording operation conducted when the magnification N=1. Since the magnification N is an odd number, the head selection switch 12 switches over the heads 2a and 2b so that the heads 2a and 2b are used in record or reproduction. Since the heads 2a and 2b have the mutual positional relationship in which they are opposed to each other at a central angle of 180°, the heads alternately scan the tape 5 for every one half revolution of the rotary drum 1. The original record data blocks D1, D2, . . . are processed in the signal processing unit into the record data DR1, DR2, . . . , and then alternately recorded by the head 2a or 2b for every one half revolution (=N/2 revolutions).

FIG. 5C shows the recording operation conducted when the magnification N=2. Since the magnification N is an even number, the head selection switch 12 switches over the heads 2a and 2c so that the heads 2a and 2c are used in record or reproduction. Since the heads 2a and 2c are disposed in close proximity to each other, the heads scan the tape 5 at the substantially same timing for every one revolution of the rotary drum 1. The original record data blocks D1, D2, . . . are processed in the signal processing unit 14 into the record data DR1, DR2, . . . respectively corresponding to two data blocks. The record data DR1 are data of the combination (D1+D2) of data blocks, and the record data DR2 . . . are data of the combination (D3+D4) . . . of data blocks. The record data are then alternately recorded by the head 2a or 2c for every one revolution (=N/2 revolutions).

FIG. 5D shows the recording operation conducted when the magnification N is 3. Since N is an odd number, the head selection switch 12 switches over the heads 2a and 2b so that the heads 2a and 2b are used in record or reproduction. Since the heads 2a and 2b have the mutual positional relationship in which they are opposed to each other at a central angle of 180°, the heads alternately scan the tape 5 for every one half revolution of the rotary drum 1. The original record data blocks D1, D2, . . . are processed in the signal processing unit 14 into the record data DR1, DR2, . . . respectively corresponding to three data blocks. The record data DR1 are data of the combination (D1+D2+D3) of data blocks and the record data DR2 are data of the combination (D4+D5+D6) of data blocks. The record data are then alternately recorded by the head 2a or 2b for every one and a half revolutions (=N/2 revolutions) of the rotary drum 1.

FIG. 5E shows the recording operation conducted when the magnification N is 4. Since the magnification N is an even number, the head selection switch 12 switches over the heads 2a and 2c so that the heads 2a and 2c are used in record or reproduction. Since the heads 2a and 2c are disposed in close proximity to each other, the heads scan the tape 5 at the substantially same timing for every one revolution of the rotary drum 1. The original record data blocks D1, D2, . . . are processed in the signal processing unit 14 into the record data DR1, DR2, . . . respectively corresponding to four data blocks. When the record data DR1, DR2, . . . are indicated by using a suffix n or a general formula DRn, the record data DRn are data of the combination (D(4n−3)+D(4n−2)+D(4n−1)+D(4n)) of data blocks. The record data are then alternately recorded by the head 2a or 2c for every two revolutions (=N/2 revolutions) of the rotary drum 1.

The time period Tr in FIGS. 5A to 5E indicates the time period required for the head 2a, 2b, or 2c to scan one track of the tape 5.

In the above, the recording operations in the cases where the magnification N is 1, 2, 3, or 4 have been described with reference to FIGS. 5A to 5E. As described above, the reproducing operation is conducted in a similar manner. In reproduction, reproduced data for one track are time-base-expanded in the signal processing unit 14 to data of N×τ seconds and then restored to the original data by conducting processes such as error correction and removal of information added in recording operation Hereinafter, the height difference between the heads 2a and 2c will be discussed. The heads 2a and 2c are separated from each other by the central angle θ, and the head 2c leads the head 2a in the rotation direction of the rotary drum 1. When the magnification N is an even number, the heads 2a and 2c alternately conduct record or reproduction for every N/2 revolutions. Strictly speaking, the heads 2a and 2c are not at the same position. Consequently, the start of the scanning operation of the head 2c is earlier than that of the head 2a by the time period corresponding to revolution of the angle θ of the rotary drum 1. In consideration of the distance in which the tape 5 runs for the time period, therefore, the head 2c must be upward deviated in height from the head 2a. This will be described below in more detail.

Figure 6:
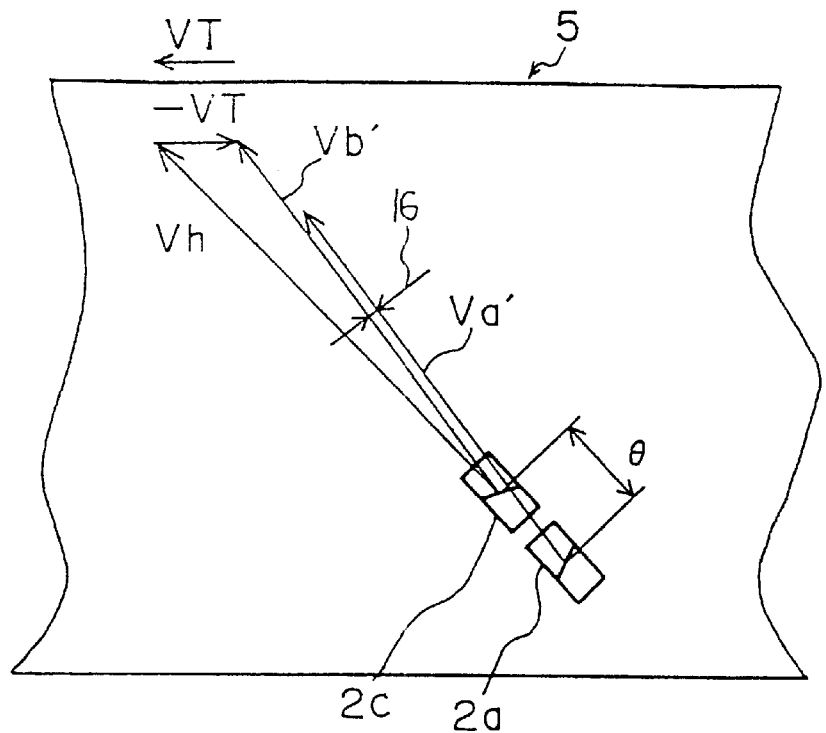
FIG. 6 is a plan view of a tape showing the head scan error.
Figure 7:
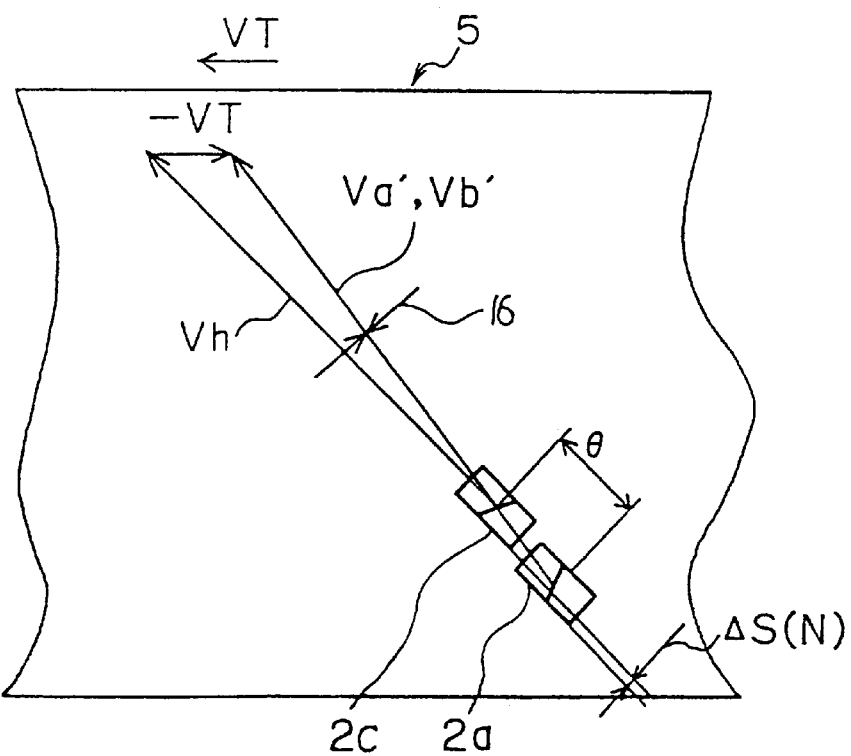
FIG. 7 is a plan view of a tape showing deviation of a head position.

FIG. 6 shows the tape 5 which is wound around the rotary drum 1, in a developed manner. It is assumed that the heads 2a and 2c in FIG. 6 are attached without height difference. When the rotary drum 1 rotates, the heads moves in vector Vh. On the other hand, the tape 5 also runs in vector VT. As a result, the tape 5 and the head 2c relatively move as indicated by an arrow Vb' in FIG. 6. Similarly, the tape 5 and the head 2a relatively move as indicated by an arrow Va' in FIG. 6. The arrows Va' and Vb' show the scanning loci of the heads 2a and 2c, respectively. As shown in FIG. 6, "deviation" is produced between the scanning loci. This deviation is called a head scan error 16. In contrast, when a height difference is previously formed as shown in FIG. 7, the head scan error 16 can be canceled to be zero. The height difference of heads which is formed for preventing the head scan error 16 from occurring when record or reproduction is conducted at a 1/N-fold speed is called the necessary height difference ΔS(N).

The necessary height difference ΔS(N) is obtained in the following manner. At the reference tape speed, during a period when the rotary drum 1 makes one revolution, the head scan position is deviated by two track pitches 2Tp in the track width direction. During a period when the rotary drum 1 makes a revolution of the angle θ, therefore, the head scan position is deviated by Tp×θ/180. In a 1/N long-recording-time mode, the tape speed is lowered to one Nth, therefore, the head scan position is deviated by Tp×θ/(180×N) during a period when the rotary drum 1 makes a revolution of the angle θ. Consequently, the head scan error 16 can be canceled by previously forming a height difference corresponding to the deviation, between the heads 2a and 2c. Therefore, the necessary height difference ΔS(N) is Tp×θ/(180×N). In actual heads, an error corresponding to the difference between the minute height difference H among the heads and the necessary height difference ΔS(N) is produced in the head scan position. This error causes the head scan error 16.

If the minute height difference H among the heads is identical with the necessary height difference ΔS(N) have the same value, the head scan error 16 can be eliminated. However, it is impossible to set the minute height difference H among the heads so as to be identical with the necessary height difference ΔS(N) in a plurality of magnifications N (even numbers), because the necessary height difference ΔS(N) varies depending on the magnification N. When the magnification N is 2, the necessary height difference ΔS(2) is Tp×θ/360. As the magnification N is larger, the more the necessary height difference ΔS(N) approaches zero. Generally, the number of magnifications N is finite. The magnifications N may be 1 and 2 only. Alternatively, the magnifications N may be 3 in kind or 1, 2, and 8. In the former case, when the minute height difference H is ΔS(2), the head scan error 16 can be made zero. In the latter case, in order to minimize the head scan error 16, the minute height difference H is set to be (ΔS(2)−ΔS(8))/2

In the case where the magnification N is 1, 2, . . . , or N, generally, as the magnification N is larger, the more the minute height difference ΔS(N) approaches zero. In order to reduce the head scan error 16, therefore, the minute height difference H is set to be ΔS(2)/2. When the minute height differences H among the heads are set in the range which satisfies ΔS(2)/2≦ minute height difference H≦ΔS(2), i.e., Tp×θ/720≦ minute height difference H≦Tp×θ/360, therefore, it is possible to reduce the head scan error 16. According to this setting, for all the magnifications N, the head scan error 16 is not greater than Tp×θ/360. In a calculation example in which the track pitch Tp is 9 μm and the central angle θ is 10°, the head scan error 16 is 0.25 μm or less. The head scan error 16 appears in the form of variation in track width. The difference between track widths 9a and 9b is twice the head scan error 16. In the term of the track pitch ratio, the difference is about 5% or less. This value is not greater than one half that obtained in the case where, for example, the heads 2a and 2c are mounted at the same height. In this way, the minute height difference H between the heads 2a and 2c is set to be in the above-mentioned range, and hence the head scan error 16 can be reduced with the result that the variation in record track width can be minimized.

As seen from the above description, the invention can provide a recording and reproducing apparatus in which the problem in that the track width is caused to vary by the distance between the heads 2a and 2c which are disposed in close proximity to each other can be prevented from arising.

In the embodiment, the minute height difference H between the heads 2a and 2c is formed in such a manner that the head 2c is placed at an upper position. As apparent from the description of the embodiment, the direction of the minute height difference H to be formed depends on the direction of the relative movement of the tape 5 and the heads 2 and also on whether the head 2a leads or lags. In accordance with the direction of the minute height difference, the positional relationship between the heads 2a and 2c is determined. In other words, the positional relationships between the heads are variously determined depending on the manner of executing the invention. The scope of the invention is not restricted by the embodiment.

In the embodiment, the heads 2a and 2c are disposed in close proximity to each other, and the head 2c which is used only when the magnification N is an even number is placed so as to lead the head 2a in the rotation direction of the rotary drum 1. In contrast, the head 2c may lag the head 2a as far as the heads 2a and 2c are disposed in close proximity to each other.

In the embodiment, the number of the mounted heads 2 is three. Alternatively, the number of the heads may be four as far as three heads among them operate in accordance with the invention. For example, an erasing head and a tracking head may be added so as to obtain a configuration in which four or more heads are mounted.

The apparatus of the embodiment conducts record and reproduction. Alternatively, the apparatus may be configured as an apparatus dedicated to record or reproduction. The apparatus may operate in accordance with the invention only in record, and in another manner in reproduction. For example, a tape on which record has been conducted at a 1/N-fold speed may be subjected to reproduction at a speed higher or lower than that in the record so that the data rates of the record and reproduction are different from each other.

As seen from the description of the embodiment, the head 2c is used only when the magnification N is an even number. The invention may be modified so that the magnification N is restricted to an odd number and the head 2c is not disposed.

In the embodiment, the input signal 15 is continuously input. When the input signal 15 is not continuous, a countermeasure may be taken so that a circuit which temporarily stores the input signal 15 and converts it into a continuous signal is connected. Therefore, the input signal 15 is not required to be always a continuous signal.

In the embodiment, the data rate in the N-fold long-recording-time mode is one N-th the reference data rate. This means that the data rate of original record data including additional record information such as synchronization information, ID information, a header, and an error correcting code is one N-th that of the standard mode. The data rate of the input signal 15 is not required to be always one N-th that of the standard mode. When the amount of additional record information is sufficiently smaller than an input signal, for example, the data rate of the input signal 15 is required to be equal to or less than about one N-th the input signal 15 of the standard mode. Generally, the data rate of the original record data is required not to be larger than about one N-th the standard mode and not necessary to be constant. In this case, the data rate of the original record data is converted to one N-th the standard mode by, for example, conducting a data rate conversion processing such as that meaningless data are inserted into the data area of the original record data.

In the embodiment, the signal processing unit 14 adds synchronization information, ID information, a header, an error correcting code, and the like to the input signal 15, thereby producing original record data, and then time-base-compresses the original record data so as to produce record data for each track. Record data for each track may be produced by time-base-compressing the input signal 15 in the unit of, for example, data for about one track, and then adding synchronization information, ID information, a header, an error correcting code, and the like.

As seen from the above description, the invention can attain the following effects.

When a signal of the data rate which is one N-th the standard mode is to be recorded or reproduced, the minute height difference H between the heads 2a and 2c which are disposed in close proximity to each other is set to be Tp×θ/(180×N), whereby the head scan error 16 can be made zero. As a result, the variation in record track width can be eliminated.

Since the minute height difference H between the heads 2a and 2c which are disposed in close proximity to each other is set to be in the range of Tp×θ/720°≦ minute height difference H≦Tp×θ/360°, the head scan error 16 can be made small in a plurality of magnifications N, with the result that the variation in record track width can be minimized.

Second Embodiment

Figure 8:
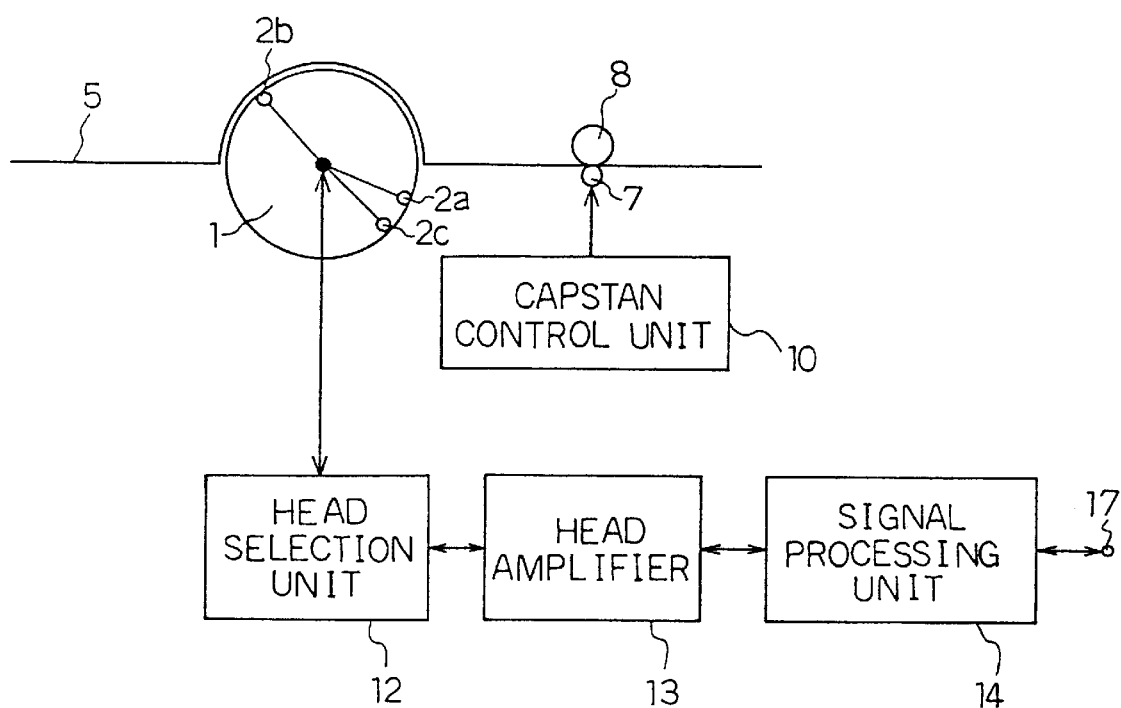
FIG. 8 is a block diagram of a recording and reproducing apparatus of a second embodiment of the invention.

FIG. 8 is a block diagram showing the configuration of the recording and reproducing apparatus of a second embodiment of the invention.

In order to simplify the description of the second and subsequent embodiments, it is assumed that the effective winding angle of the tape 5 on the rotary drum 1 is a central angle of 180°.

Referring to FIG. 8, the tape 5 is wound around the rotary drum 1. The first head 2a has a first azimuth angle (the L-azimuth angle) and the second and third heads 2b and 2c have a second azimuth angle (the R-azimuth angle). The tape 5 runs while being sandwiched between the capstan 7 and the pinch roller 8. The capstan 7 is controlled by the capstan control unit 10. The heads 2a, 2b, and 2c are connected to the head selection switch 12. The head selection switch 12 is connected to the signal processing unit 14 through the head amplifier 13. A signal is input to or output from the signal processing unit 14 through a digital signal input and output terminal 17.

Figure 9:
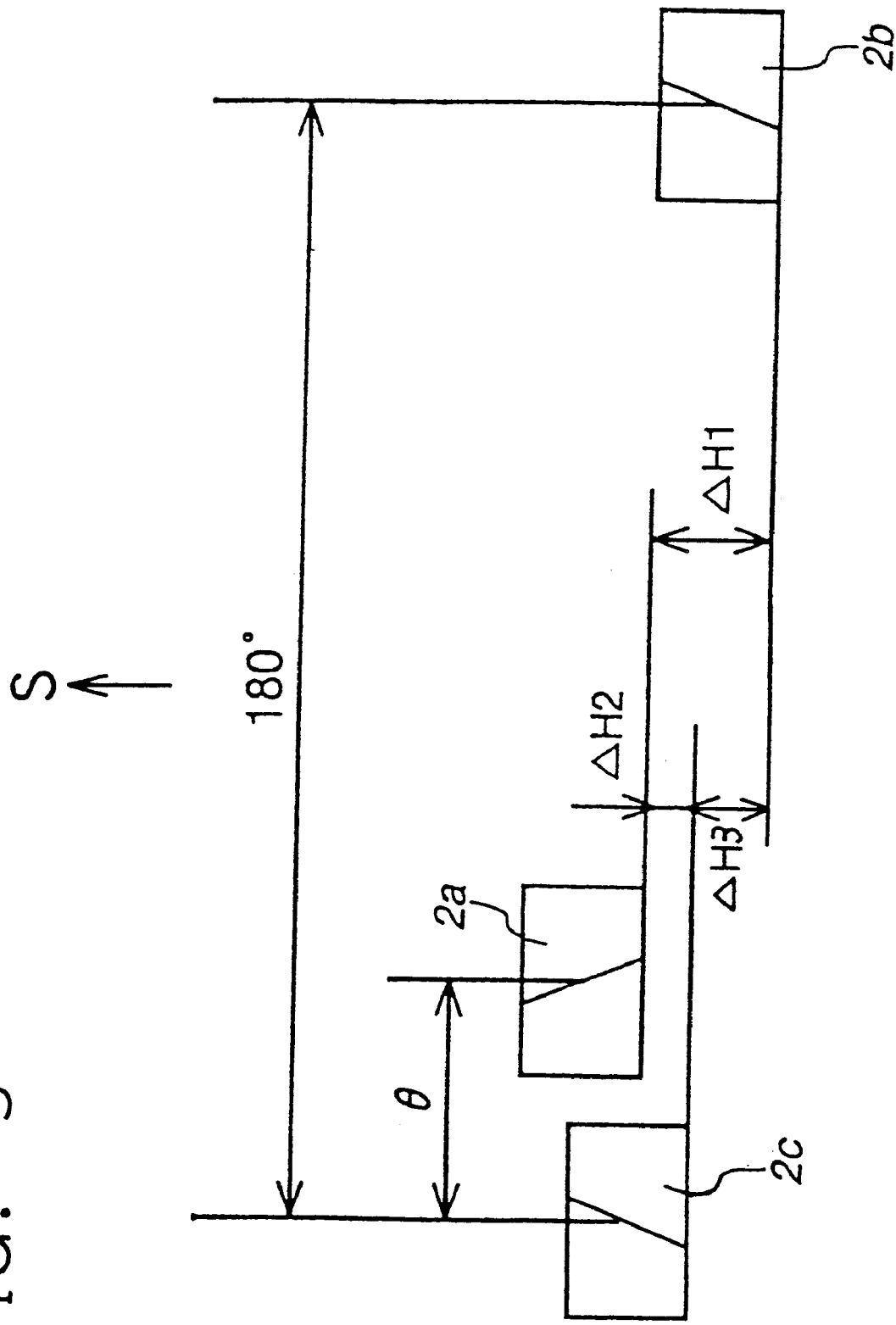
FIG. 9 is an arrangement diagram showing a height difference of heads mounted in the second embodiment.

FIG. 9 is a diagram showing positions where the heads are attached in the recording and reproducing apparatus of the second embodiment of the invention. The arrow S indicates the upward direction in the rotation shaft direction of the rotary drum 1. In FIG. 9, the same components as those of FIG. 8 are designated by the same reference numerals and their description is omitted. Referring to FIG. 9, the heads 2b and 2c are attached to the rotary drum 1 so as to be opposed to each other at a central angle of 180°. The heads 2c and 2a are positioned in close proximity to each other in the circumferential direction of the rotary drum 1 with a central angle difference θ. The heads 2b and 2a are attached with a first minute height difference ΔH1 in the rotation shaft direction of the rotary drum 1 indicated by the arrow S, and the heads 2c and 2a are attached with a second minute height difference ΔH2 in the rotation shaft direction of the rotary drum 1.

The operation of the thus configured recording and reproducing apparatus will be described with reference to FIGS. 8 and 9.

The recording and reproducing apparatus of the embodiment has the standard mode and a long-recording-time mode in which the record time is N times that of the standard mode (where N is a natural number). The rotary drum 1 rotates at a constant speed irrespective of the change of the mode. The tape 5 is slantly wound around the rotary drum 1 over a central angle of 180° and odd, and driven at a predetermined speed by the capstan 7 and the pinch roller 8. The capstan control unit 10 controls the rotation speed of the capstan 7 so that, in an N-fold long-recording-time mode, the tape runs at a constant speed which is one N-th the standard mode. At the timing conforming to the modes, the head selection switch 12 selects the head which is to conduct record or reproduction. The head amplifier 13 amplifies a record or reproduced signal.

In a long-recording-time mode, the signal processing unit 14 conducts processes such as compression coding of a signal, expansion decoding, time-base-compression/expansion, and error correction. Specifically, in record of an N-fold long-recording-time mode, a digital signal supplied to the digital signal input and output terminal 17 is subjected in the signal processing unit 14 to data compression to the magnification 1/N to be coded, and time-base compression, and then supplied to the head amplifier 13. In the embodiment, it is assumed that a signal to which synchronization information, ID information, a header, an error correcting code, and the like have already added is supplied to the digital signal input and output terminal 17. Also in the case where synchronization information, etc. are added in the signal processing unit 14 in the same manner as the first embodiment, the same effects as those of the present embodiment can be attained by conducting signal processing so that the data rate of record data containing synchronization information, etc. is not greater than one N-th the magnification of the standard mode. In reproduction of an N-fold long-recording-time mode, a reproduced signal from the head amplifier 13 is subjected in the signal processing unit 14 to N-fold time-base-expansion and expansion-decoding, and then supplied to the digital signal input and output terminal 17.

Figure 10:
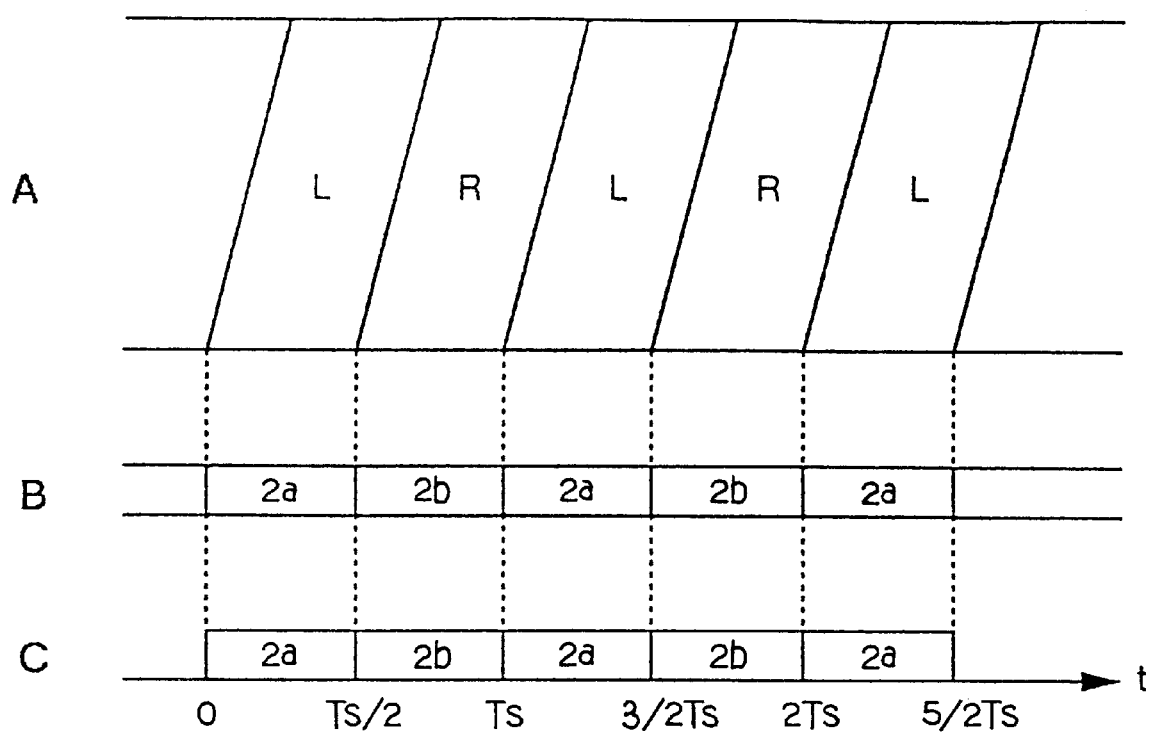
FIG. 10 is a timing chart of the operation of the second embodiment.
Figure 11:
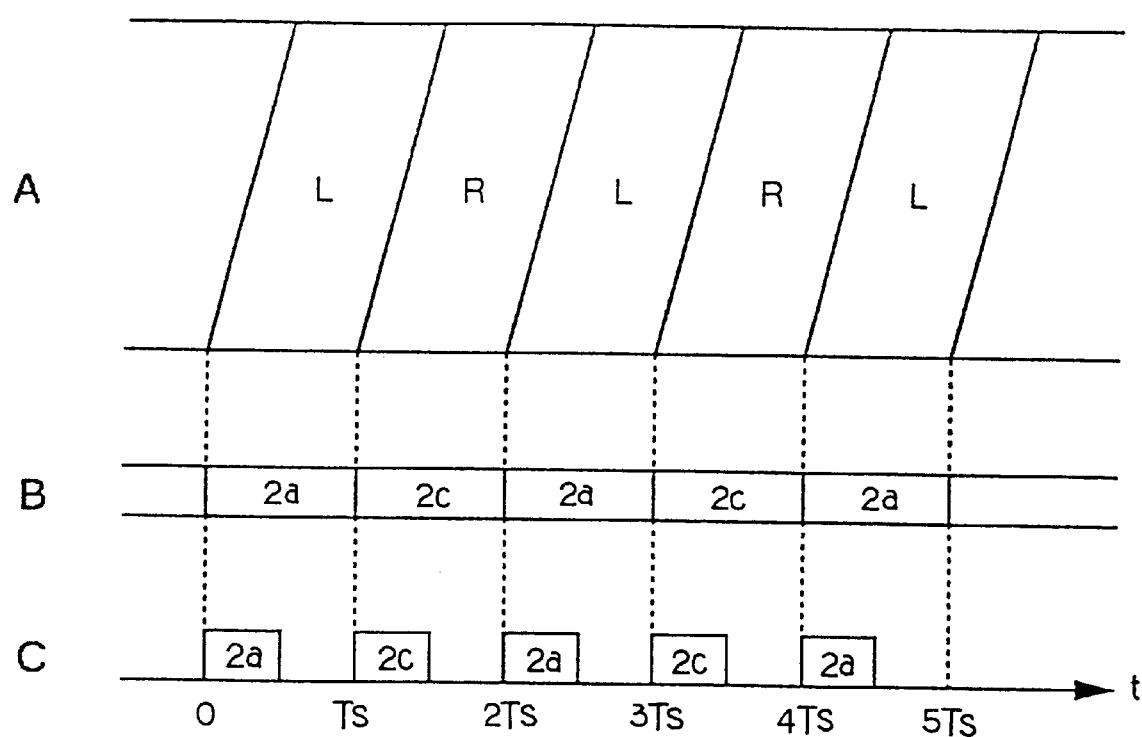
FIG. 11 is a timing chart of the operation of the second embodiment.

FIGS. 10 and 11 are timing charts showing head-selection and record timings in signal record in the recording and reproducing apparatus of the second embodiment of the invention. Row A shows the azimuth of a record track, row B shows the head which is used in record, and row C shows the record timing of the head which is used in record. In the time axis t, the time period required for the rotary drum 1 to make one revolution is indicated by Ts and the zone in which record is conducted is indicated by a rectangle.

FIG. 10 shows head-selection and record timings in the standard mode. In the standard mode, the tape 5 runs at a speed by which the head scan position is deviated by one track pitch 1 Tp while the rotary drum 1 makes one half revolution. In the standard mode, the heads 2b and 2a alternately conduct record for every one half revolution of the rotary drum 1. The head 2a leads the position opposed to the head 2b at a central angle of 180°, by an angle θ in the rotation direction of the rotary drum 1, so that the start of the scanning operation of the head 2a is earlier by the time period corresponding to revolution of the angle θ of the rotary drum 1.

In consideration of the distance in which the tape 5 runs for the time period when the rotary drum 1 makes revolution of the angle θ, the head 2a is attached so as to be deviated upward as indicated by the arrow S from the head 2b by the minute height difference ΔH1. As a result of the provision of the minute height difference ΔH1, record tracks of a track pitch Tp can be formed. The head scan is deviated by one track pitch 1Tp during a period when the rotary drum 1 makes one half revolution (=180°), and hence the optimum height difference H1 in the standard mode is Tp×θ/180. Since the heads 2a and 2b alternately conduct record, adjacent tracks are inverted in azimuth from each other. Therefore, high-density record is enabled without using a guard band. It is a matter of course that the head 2a may be located at a position which is separated in a direction opposite to the rotation direction of the rotary drum 1 by a central angle θ from the position opposed to the head 2b at 180°.

FIG. 11 shows head-selection and record timings in a long-recording-time mode (2-fold long-recording-time mode) in which the record time is two times that of the standard mode. In the 2-fold long-recording-time mode, the tape 5 runs at a speed by which the head scan position is deviated by one track pitch 1Tp while the rotary drum 1 makes one revolution. In the 2-fold long-recording-time mode, the heads 2c and 2a alternately conduct record for every revolution of the rotary drum 1. The head 2a leads the head 2c by a central angle θ in the rotation direction of the rotary drum 1, so that the start of the scanning operation of the head 2a is earlier by the time period corresponding to revolution of the angle θ of the rotary drum 1.

In consideration of the distance in which the tape 5 runs for the time period when the rotary drum 1 makes revolution of the angle θ, the head 2a is attached so as to be deviated upward as indicated by the arrow S from the head 2c by the minute height difference ΔH2. As a result of the provision of the minute height difference ΔH2, record tracks of a track pitch Tp can be formed. The head scan is deviated by one track pitch 1Tp during a period when the rotary drum 1 makes one revolution (=360°), and hence the optimum height difference ΔH2 in the 2-fold long-recording-time mode is Tp×θ/360. Since the heads 2c and 2a alternately conduct record, adjacent tracks are inverted in azimuth from each other. Therefore, high-density record is enabled without using a guard band. A digital signal which is to be recorded in the 2-fold long-recording-time mode is obtained by compression-coding a digital signal to a data rate which is about one half that of the standard mode and then ½-time-base-compressing the compressed signal.

In the above, the operations in the standard mode and the 2-fold long-recording-time mode have been described. In an N-fold long-recording-time mode (where N is a natural number), generally, the running speed of the tape 5 is set to be one N-th the standard mode and record is conducted for every N/2 revolutions of the rotary drum 1. In other words, when the magnification N is an odd number, record is conducted by the heads 2b and 2a, and, when the magnification N is an even number, the heads 2c and 2a alternately conduct record. As a result, record tracks among which adjacent tracks are inverted in azimuth from each other can be formed at a width which is approximately equal to the track pitch Tp. In an N-fold long-recording-time mode, a digital signal which has been subjected to compression-coding to a data rate which is about one N-th that of the standard mode and then 1/N-fold time-base-compression is recorded.

In the above, the operation in record has been described. Also in reproduction, record tracks can be traced by operating the heads in a similar manner as the case of record. Therefore, the description of the operation in reproduction is omitted. A reproduced digital signal in an N-fold long-recording-time mode is subjected in the signal processing unit 14 to N-fold time-base-expansion and expansion-decoding.

Figure 12:
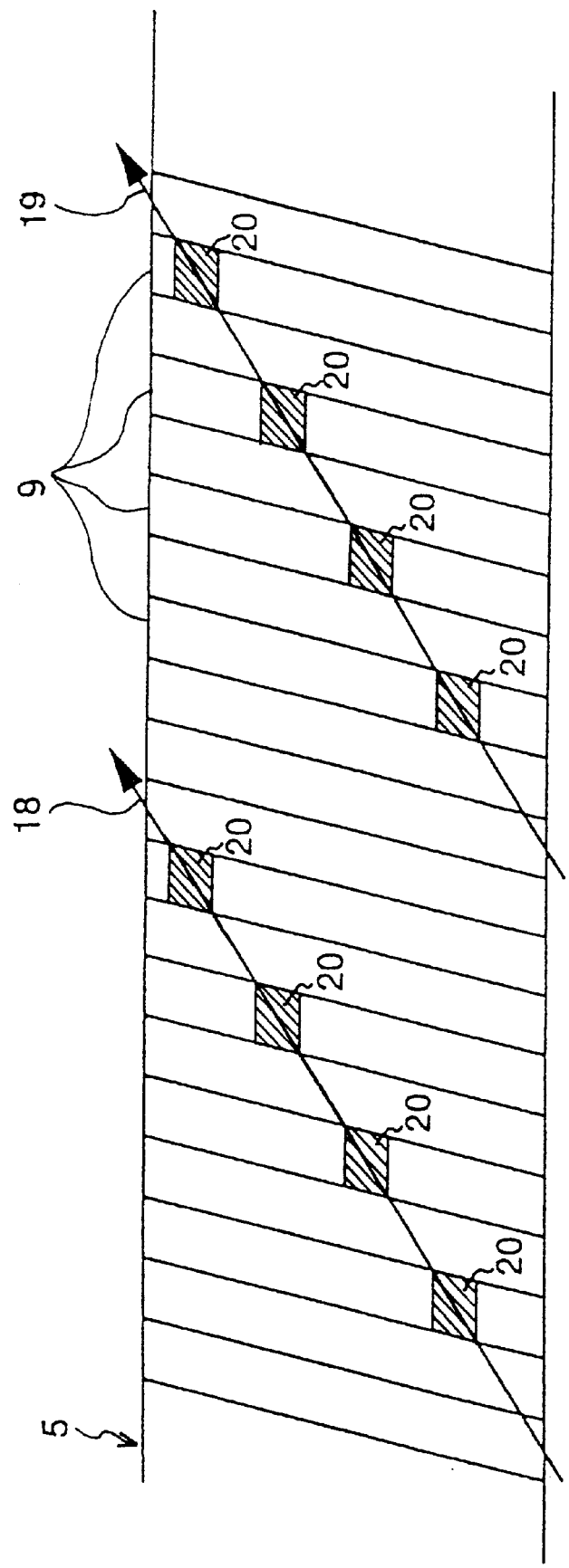
FIG. 12 is a plan view of a tape illustrating the search operation of the second embodiment.

Next, the operation in search will be described. FIG. 12 is a plan view of the tape 5 showing the head scan locus in search and the arrangement of search data. In FIG. 12, boxes 20 indicate search data. The tape 5 is caused to run at a speed which is ten times that of the standard mode, and the revolution number of the rotary drum 1 is adjusted so that the relative movement of the tape and the heads is corrected, thereby conducting 10-speed search. It is assumed that the search data 20 are disposed in tracks which are recorded by a head of the second azimuth angle or the R-azimuth angle (hereinafter, such a track is referred to as R-azimuth track). Since search data are disposed in tracks of the second azimuth angle, the search data are reproduced by using the heads 2b and 2c of the second azimuth angle. As a result, the scan locus 18 of the head 2b and the scan locus 19 of the head 2c in 10-speed search are obtained. In search, as shown in FIG. 12, the search data 20 are located at specific positions of the tracks 9 and the capstan 7 is controlled so that the positions are scanned by the heads, thereby reproducing the search data.

In the embodiment, as shown in FIG. 9, since the first minute height difference ΔH1 is produced between the heads 2b and 2a and the second minute height difference ΔH2 between the heads 2c and 2a, a minute height difference ΔH3 is produced between the heads 2b and 2c. The minute height difference ΔH3 is a difference between the height differences ΔH1 and ΔH2 (=Tp×θ/360). In search, therefore, deviation corresponding to the minute height difference ΔH3 is produced in scan position of the heads 2b and 2c. In the embodiment, since the heads 2b and 2c which are used in search are mounted on the rotary drum 1 with being opposed to each other at a central angle of 180°, the deviation amount in scan position of the heads 2b and 2c in search is always constant irrespective of the search speed.

Figure 13:
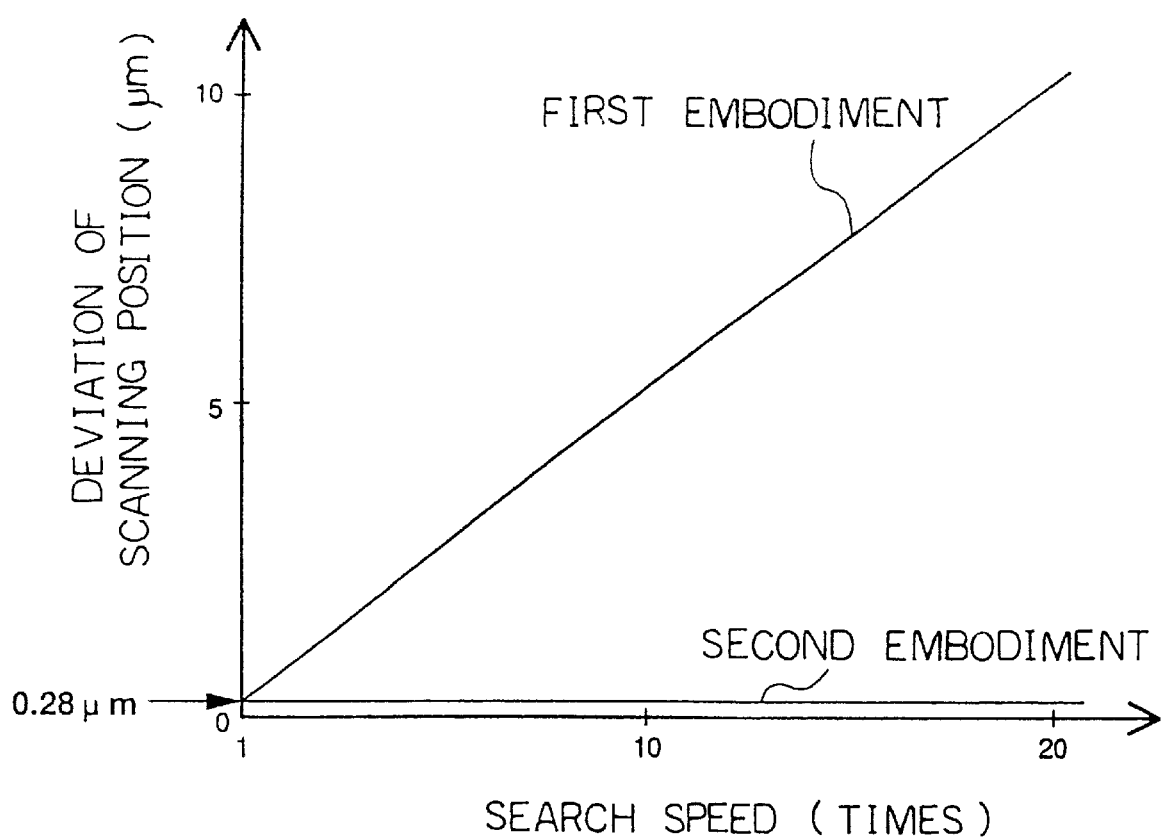
FIG. 13 is a graph showing relationships between search speeds and scan positions in the first and second embodiments.

FIG. 13 is a graph showing relationships between search speeds and scan positions in the first and second embodiments in the case where the track pitch Tp is 10 μm and the angle θ is 10°. In the first embodiment, when a signal of the data rate of the magnification 1/N (N=1 or 2) is to be recorded or reproduced, for example, the minute height difference between the heads 2a and 2c is set to be the necessary height difference ΔS(2)=Tp×θ/360. At this time, also the height difference between the heads 2b and 2c is Tp×θ/360. In the case where such height differences are produced, when the search speed is P-fold, deviation in scan position in the search using the heads 2b and 2c is (P−½)× Tp×θ/180. As shown in FIG. 13, therefore, deviation in scan position in the first embodiment is increased in proportion to the search speed and 5.3 μm at 10-fold speed. In contrast, deviation in scan position in the second embodiment is constant irrespective of the search speed and its value Δx is 0.28 (μm). Even when error factors such as tape speed variation are considered, deviation in scan position of such an amount allows the search data 20 to be surely reproduced. In the embodiment, therefore, both the heads 2b and 2c can reproduce the search data while the rotary drum 1 makes one revolution.

As seen from the above description, according to the second embodiment, since the heads 2b and 2c of the second azimuth angle are disposed at positions of the rotary drum 1 which are opposed each other at a central angle of 180°, the deviation amount in scan position of the heads 2b and 2c in search can be reduced and made always constant irrespective of the search speed. Even in a high speed search, therefore, the search data 20 can be surely reproduced.

Since the first minute height difference H1 is set to be Tp×θ/180 and the second minute height difference H2 to be Tp×θ/360, deviation in scan position in the standard mode and the 2-fold long-recording-time mode can be eliminated. This allows also the track pitch Tp in record and reproduction in the standard mode and the 2-fold long-recording-time mode, to have a predetermined normal value.

In the embodiment, in an N-fold long-recording-time mode wherein the magnification N is an even number, the running speed of the tape 5 is set to be one N-th the standard mode and the heads 2c and 2a alternately conduct record or reproduction for every N/2 revolutions of the rotary drum 1. In the case where the recording and reproducing apparatus has only modes in which the magnification N is an even number, the heads 2c and 2a may simultaneously conduct record or reproduction for every N revolutions of the rotary drum 1. In this case, the heads 2c and 2a are attached with a height difference approximately equal to the track pitch Tp in the rotation shaft direction of the rotary drum 1, and the heads 2b and 2c are attached at the same height in the rotation shaft direction of the rotary drum 1. According to this configuration, deviation in scan position in search is prevented from occurring.

In the embodiment, in order to eliminate deviation in scan position in the standard mode and the 2-fold long-recording-time mode, the first minute height difference ΔH1 is set to be Tp×θ/180 and the second minute height difference ΔH2 to be Tp×θ/360. The first and second minute height differences ΔH1 and ΔH2 may be appropriately set so that deviation in scan position does not occur in an arbitrary mode. When the first minute height difference ΔH1 is set so that deviation in scan position does not occur in the 3-fold long-recording-time mode, for example, the head scan position is deviated by one track pitch 1Tp while the rotary drum 1 makes 3/2-revolutions (=540°), and hence ΔH1 is Tp×θ/ 540. Alternatively, the first and second minute height differences ΔH1 and ΔH2 may be set so that deviation in scan position is minimum in a plurality of modes. In order that deviation in scan position is minimum in two modes, the standard mode and the 3-fold long-recording-time mode, for example, the minute height difference ΔH1 may be set to be an intermediate value of those in the two modes, i.e., Tp×θ/270.

In the embodiment, a digital signal supplied to the digital signal input and output terminal 17 is subjected in the signal processing unit 14 to compression-coding to the magnification 1/N and time-base-compression. Alternatively, as described in the first embodiment, a digital signal of the data rate which is one N-th record data may be supplied to the digital signal input and output terminal 17. In the alternative, the signal processing unit 14 is not required to conduct 1/N-compression-coding. This is applicable also to the output operation.

Third Embodiment

Hereinafter, a third embodiment of the present invention will be described with reference to FIG. 14–FIG. 18.

The configuration of the recording and reproducing apparatus of the third embodiment of the invention are similar to those of the second embodiment, and hence its description is omitted. The third embodiment is different from the second embodiment in the positions of the heads and deviation in scan position. These differences will be described.

Figure 14:
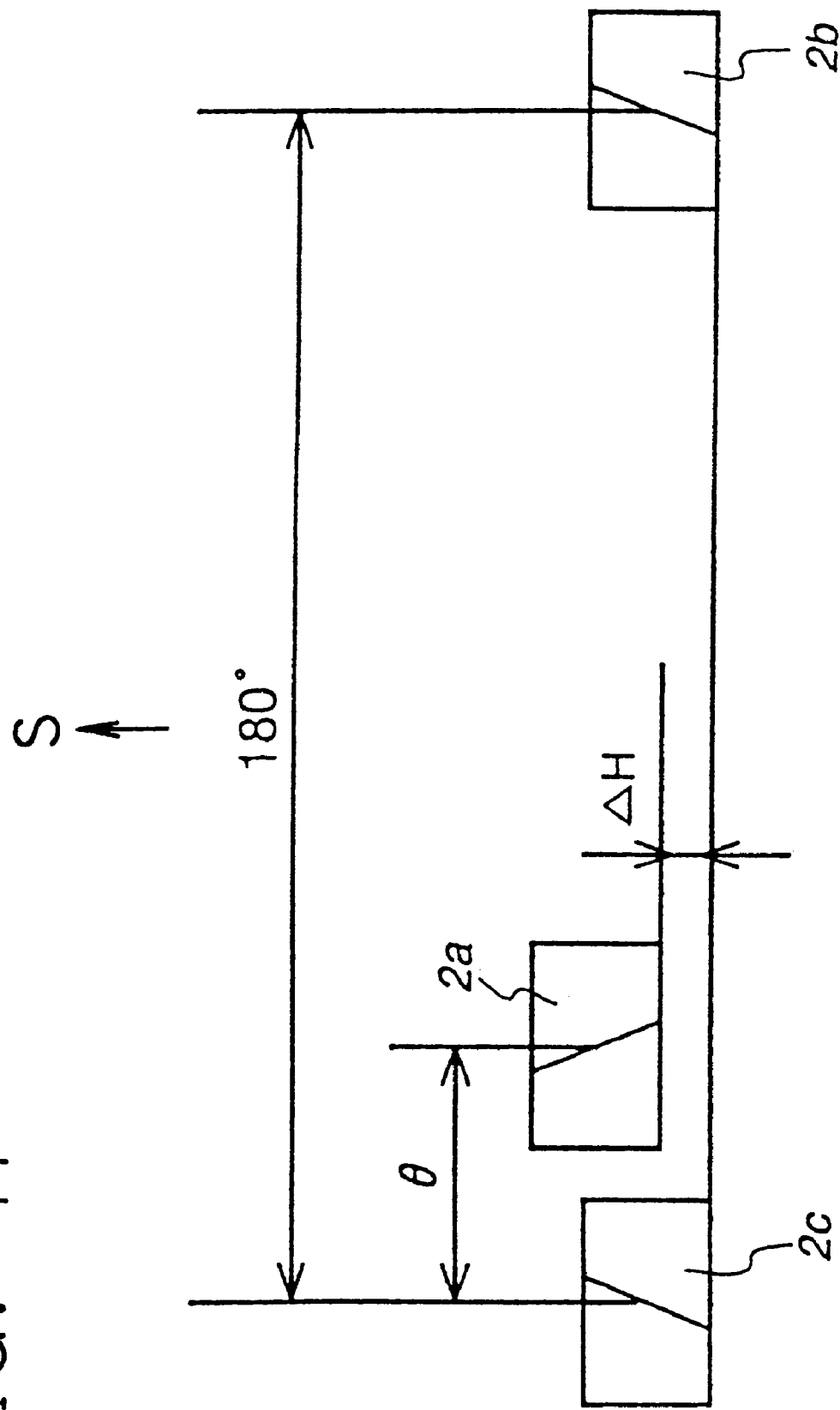
FIG. 14 is a diagram showing a height difference of heads mounted in a third embodiment.

FIG. 14 is a diagram illustrating the positions of the heads in the recording and reproducing apparatus of the third embodiment of the invention. Referring to FIG. 14, the heads 2b and 2c are mounted on the rotary drum 1 at a central angle of 180°, and the heads 2c and 2a are mounted in close proximity to each other in the circumferential direction of the rotary drum 1 with a central angle difference θ. The heads 2b and 2c are at the same height in the rotation shaft direction of the rotary drum 1 indicated by the arrow S, and the heads 2c and 2a are attached with a minute height difference ΔH in the rotation shaft direction S of the rotary drum 1. Consequently, also the minute height difference between the heads 2b and 2c in the rotation shaft direction of the rotary drum 1 is ΔH.

The method of setting the minute height difference ΔH will be described. According to the third embodiment, deviation in head scan can be eliminated in a specific mode by setting the minute height difference ΔH to be an appropriate value. The method of setting the minute height difference ΔH is the same as that in the second embodiment. The minute height difference ΔH is set to be equal to a value which is obtained by converting the distance in which the tape 5 runs for the time period when the rotary drum 1 makes revolution of the angle θ, into the track pitch direction. In the standard mode, for example, the head scan is deviated by one track pitch 1Tp during a period when the rotary drum 1 makes one half revolution (=180°). When the minute height difference ΔH is set to be Tp×θ/180, therefore, deviation in scan position between the heads 2b and 2a in the standard mode can be eliminated. Similarly, when the minute height difference ΔH is set to be Tp×θ/360, deviation in scan position between the heads 2c and 2a in the 2-fold long-recording-time mode can be eliminated.

n an N-fold long-recording-time mode, therefore, when the minute height difference ΔH is set to be Tp×θ/(180×N), deviation in scan position between the heads can be eliminated.

Generally, the more the running speed of the tape 5 is lowered, the more the error in running speed of the tape 5 becomes large. Consequently, the accuracy of record and reproduction in a long-recording-time mode in which the tape speed is lower than that of the standard mode is impaired. This produces a problem in that, when deviation in scan position of the heads once occurs in a long-recording-time mode, the accuracy of the record and reproduction is further impaired. When the minute height difference ΔH is set so that deviation in scan position is eliminated in a long-recording-time mode in which the tape 5 runs at a low speed, the accuracy of record and reproduction can be prevented from being impaired.

Next, deviation in scan position in search will be described. In the third embodiment, the heads 2b and 2c are mounted on the rotary drum 1 so as to be opposed to each other at a central angle of 180° and at the same height in the rotation shaft direction of the rotary drum 1. Therefore, deviation in scan position between the heads 2b and 2c is not produced in search, with the result that the search accuracy is further improved as compared with the second embodiment.

As described above, in the third embodiment, the heads 2b and 2c of the first azimuth angle are mounted on the rotary drum 1 so as to be opposed to each other at a central angle of 180° and at the same height in the rotation shaft direction of the rotary drum 1. Therefore, deviation in scan position between the heads in search can be eliminated so that the search accuracy is further improved.

Fourth Embodiment

Figure 15:
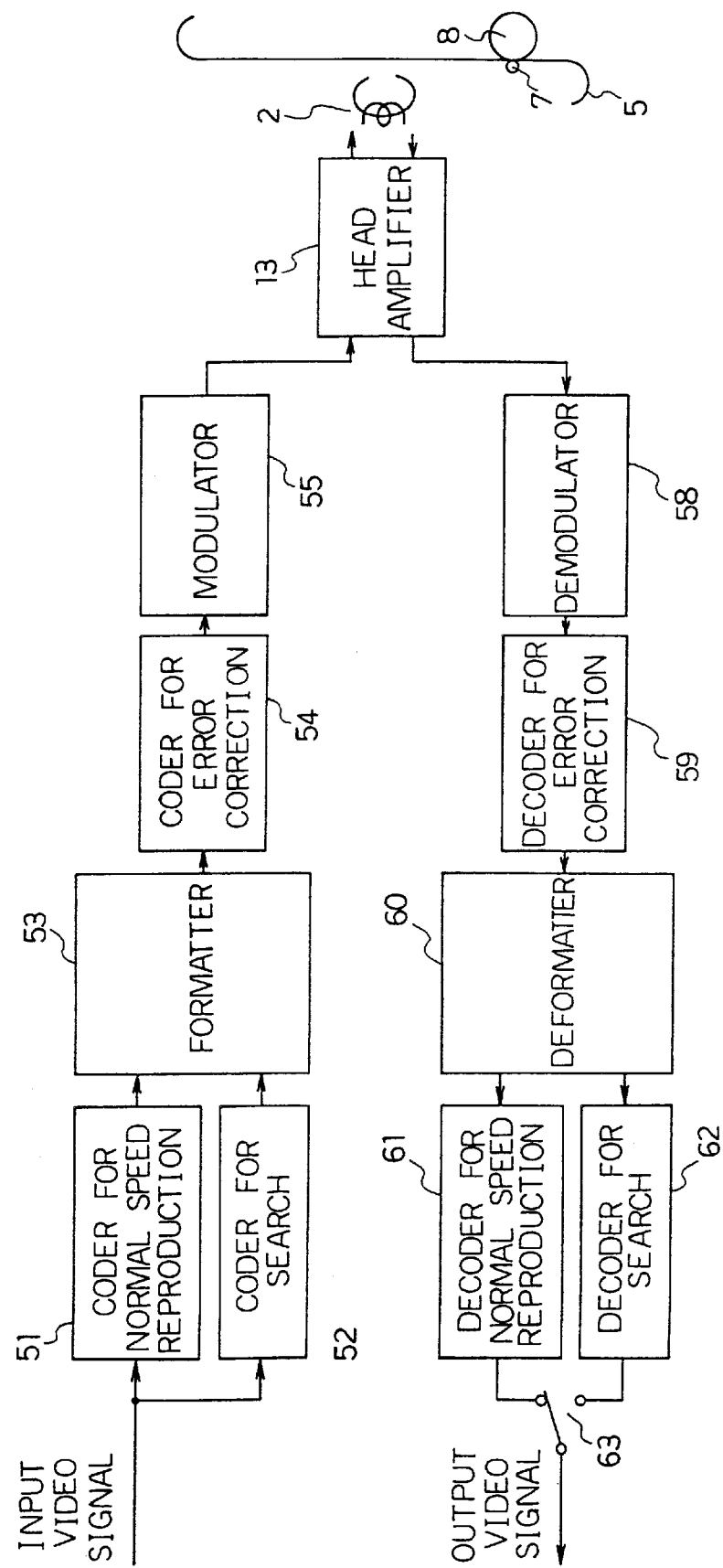
FIG. 15 is a block diagram of a recording and reproducing apparatus of a fourth embodiment of the invention.

FIG. 15 is a block diagram of the recording and reproducing apparatus of a fourth embodiment of the invention. In the figure, the heads 2 include the heads 2a, 2b, 2c, and 2d. A coder for normal speed reproduction 51, a coder for search 52, a formatter 53, a coder for error correction 54, a modulator 55, a demodulator 58, a decoder for error correction 59, a deformatter 60, a decoder for normal speed reproduction 61, a decoder for search 62, and a switch 63 correspond to the signal processing unit 14 of the first to third embodiments.

Figure 17A:
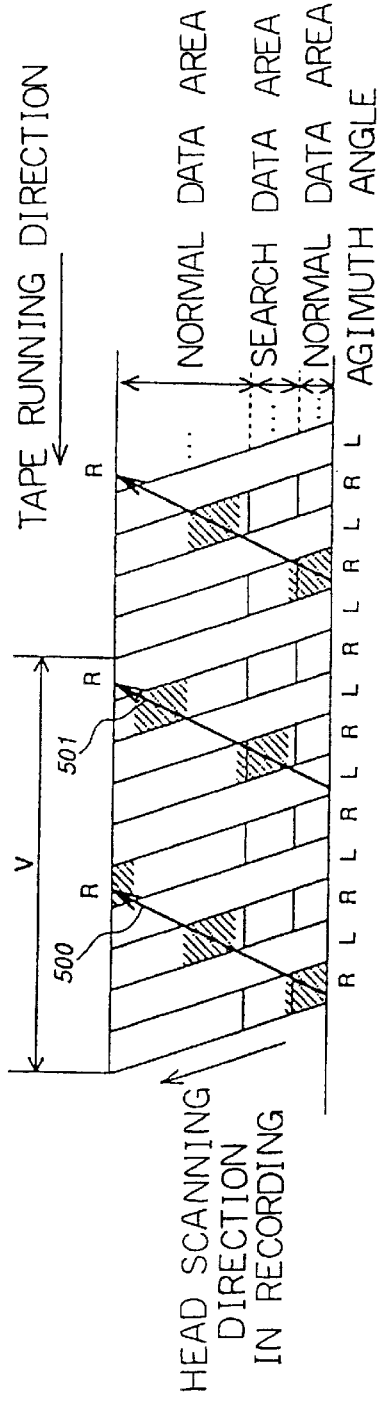
FIG. 17A is a plan view of a tape showing the track pattern in the fourth embodiment of the invention.
Figure 17B:
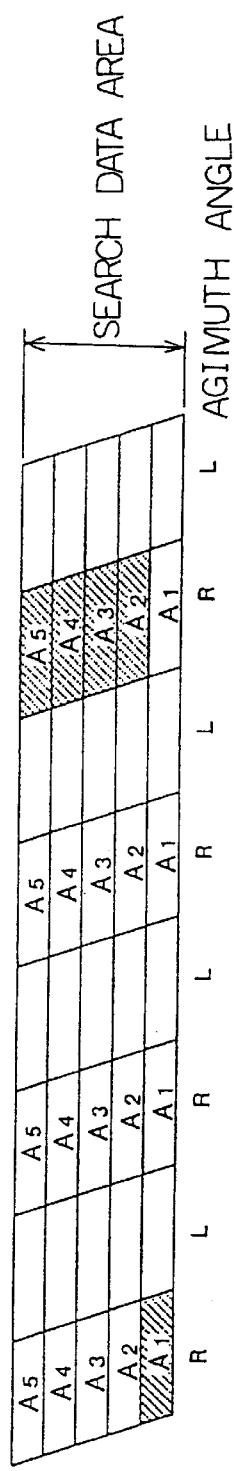
FIG. 17B is a plan view of a tape showing search data areas in the fourth embodiment of the invention in an enlarged manner.
Figure 17C:
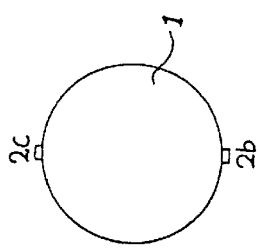
FIG. 17C is a plan view of a rotary drum showing the head arrangement in the fourth embodiment of the invention.

FIG. 17C shows the head arrangement in the embodiment. Referring to FIG. 17C, the heads 2b and 2c have the R-azimuth angle. The heads 2b and 2c are located at a central angle of about 180°, and the height difference between the heads 2b and 2c is approximately zero. The provision of the head 2a is optional. When the apparatus is configured as an apparatus dedicated for reproduction, for example, the head 2a may not be provided.

The operation of the thus configured recording and reproducing apparatus in an example case where the reference speed for search speed reproduction $N_1$ for a search data area is 5-fold speed will be described with reference to FIG. 16. The reference speed for search speed reproduction $N_1$ is a speed which is an odd-number multiple of the standard speed. Search data recorded at the standard speed can be detected when they are reproduced at the reference speed for search speed reproduction $N_1$. First, normal data areas 100–129 ... and 300, 302, 304,–328 ... are set. Similarly, search data areas 200, 202, 204–228 ... are set (STEP 1 of the flowchart of FIG. 30).

In record, a digital video signal which is obtained by A/D-converting a video signal is supplied to the coder for normal speed reproduction 51 and the coder for search 52. The coder for normal speed reproduction 51 outputs data for normal speed reproduction to the formatter 53, with compressing video data as required. In some cases, the coder 51 outputs data for normal speed reproduction as they are or without compressing the data, to the formatter 53. The coder for search 52 conducts on the digital video signal data compression of a higher level than that conducted by the coder for normal speed reproduction 51, with the result that an image can be recorded or reproduced with a reduced data amount. The data are then supplied as search data to the formatter 53. Since the reference speed for search speed reproduction $N_1$ is 5-fold speed, tracks having the same azimuth angle are divided into track sets V each consisting of 5 tracks (STEP 2 of the flowchart of FIG. 30). The coder for search 52 outputs the same data to the head 2c during a period when the head 2c records the search data area of a track set V consisting of $N_1$ (=5) tracks having the same azimuth angle.).

In order to reduce the length of each search data area, video data of one frame are divided into M divisions (where M is an integer). For example, the case where the screen division number M is set to be 2 so that the screen is divided into two areas, upper and lower halves, will be described.

The coder for search 52 extracts video data T of one frame at time t from the input video signal, and compresses the data portion of the video data T which corresponds to the upper half of the screen, thereby producing data Ta. During a period when the head 2c scans one track set V, the coder supplies the data Ta to the head 2c. Next, the coder for search 52 compresses the data portion of the video data T which corresponds to the lower half of the screen, thereby producing data Tb. During a period when the head 2c scans the next track set V, the coder supplies the data Tb to the head 2c. After the head 2c scans the two track sets V, the coder for search 52 extracts video data (T+1) of the latest one frame from the input video signal, and compresses the data portion of the video data (T+1) which corresponds to the upper half of the screen, thereby producing data (T+1)a. During a period when the head 2c scans the next track set V, the coder supplies the data (T+1)a to the head 2c. Similarly, the operations are sequentially repeated. In this case, the data amount of the upper half of the screen may be different from that of the lower half of the screen. Furthermore, the data amount of the upper half (or the lower half) of one screen may be different from that of the upper half (or the lower half) of the other screen. In other words, the length of the search data area in the track direction can be arbitrarily selected in accordance with the data amount. The screen division number M also can be arbitrarily set. In the above description, the head 2c records the search data areas. Alternatively, the head 2b may record the search data areas.

The formatter 53 rearranges data for normal speed reproduction and search data and supplies them to the coder for error correction 54. In a track set consisting of $N_1$ (=5) tracks which are recorded at the same azimuth angle and in which the same data are recorded, the search data areas is disposed at a position which is separated from the edge of the tape 5 by a predetermined distance on each track. One track is divided into plural areas. A record signal is recorded in the areas with being divided into SYNC blocks. The SYNC blocks are respectively provided with SYNC block numbers which are uniquely formed in one track. In one track, the search data area is allocated with one or more SYNC blocks. In one track set, the same search data are recorded in SYNC blocks having the same SYNC block number. Therefore, each search data area is formed in an area which is separated from the edge of the tape 5 by a predetermined distance (STEP 3 of the flowchart of FIG. 30). In the above, each track set constituting the search data areas consists of $N_1$ tracks. Alternatively, each track set may consist of $N_1$ or more tracks. The search data area may be arbitrarily disposed with using a track set consisting of $N_1$ or more tracks as one unit. For example, an interval may be formed between one track set and the subsequent track set. When an audio signal area is defined, the search data area may be disposed so as not to overlap with the audio signal area.

In the coder for error correction 54, synchronization information, ID information (SYNC block number, etc.), a header (information indicative of search data, that for identifying the track set, etc.), an error correcting code, and the like are added to the output signal of the formatter 53. The output signal is modulated in the modulator 55, and then applied to the heads 2 through the head amplifier 13 so as to be recorded onto the tape 5.

Figure 16:
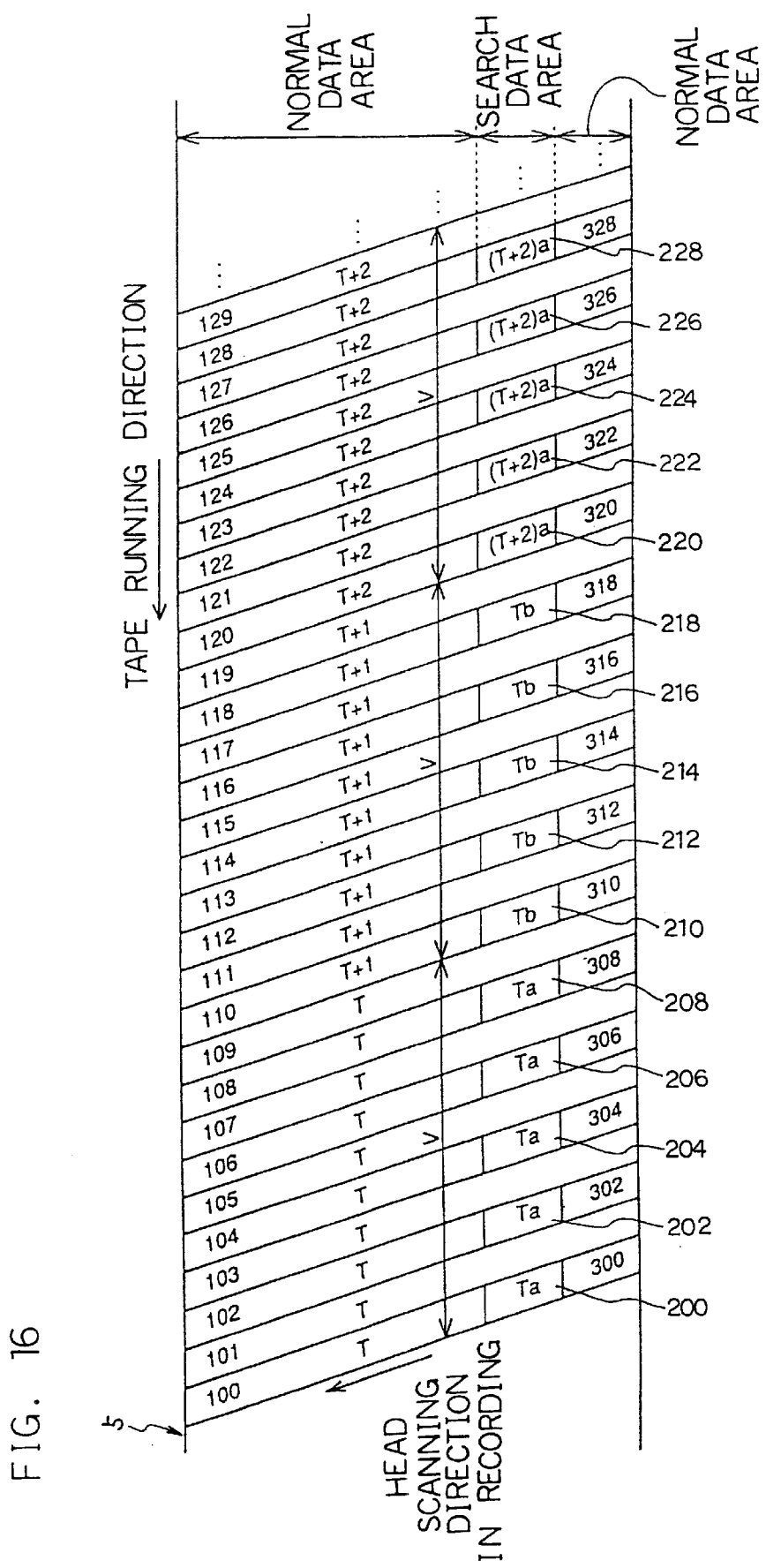
FIG. 16 is a plan view of a tape showing the track pattern in the fourth embodiment of the invention.

FIG. 16 is a plan view of the tape 5 showing the track pattern in the embodiment. In the output signal of the formatter 53, data for normal speed reproduction are recorded in normal data areas indicated as areas 100 . . . 129 and 300, 302, 304, . . . , 328. The search data for the reference speed for search speed reproduction $N_1$ are recorded in search data areas indicated as areas 200, 202, 204, . . . , 228.

In the normal data areas, video data of one frame are recorded in 10 tracks. Specifically, video data for one frame at time t are recorded in the normal data areas 100 to 109 and 300 to 308. Next, video data of one frame at time (t+1) are recorded in the normal data areas 110 to 119 and 310 to 318.

Figure 30:
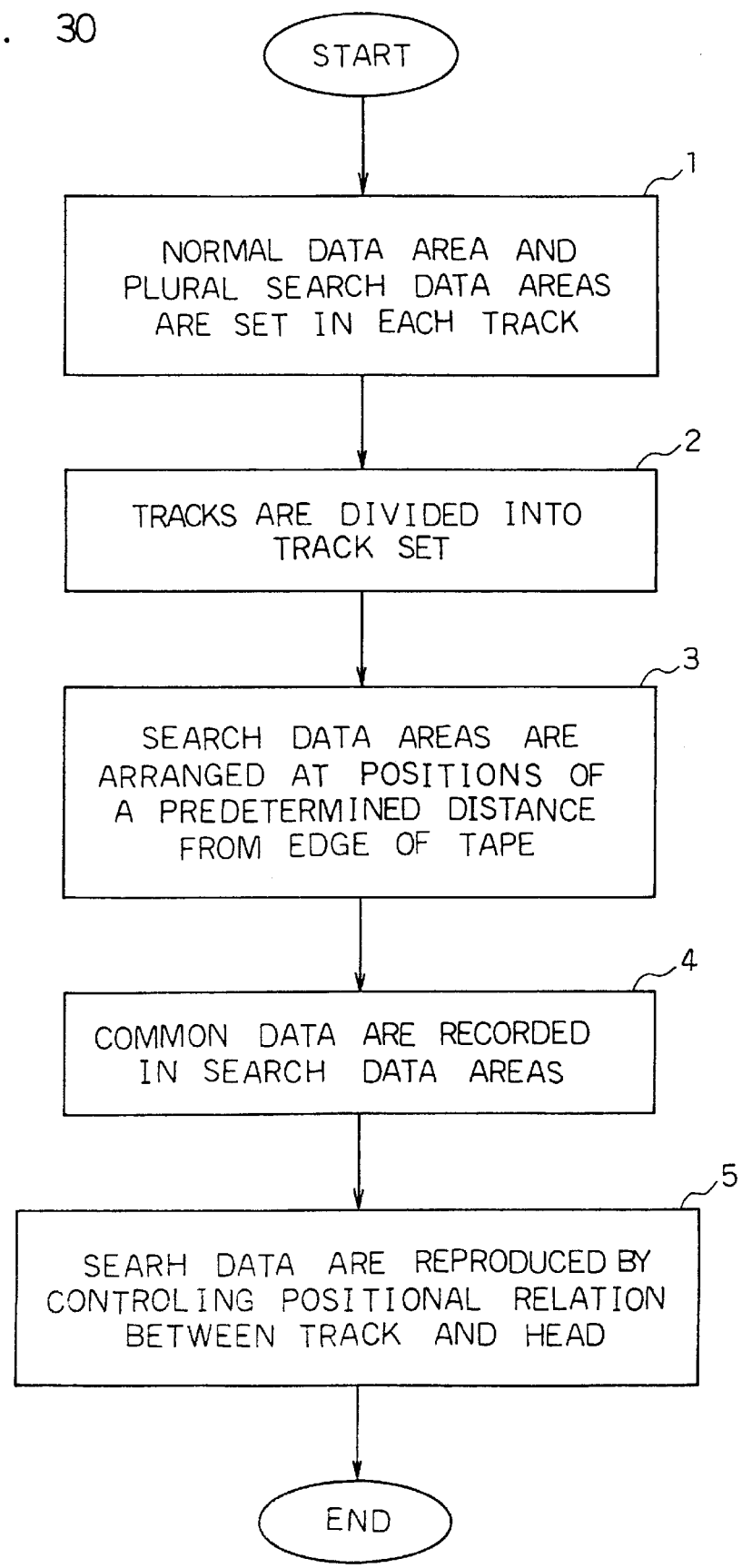
FIG. 30 is a flow chart showing the recording operation of the recording and reproducing apparatus of the invention.

On the other hand, the same scan data are recorded in all the search data areas of the track set V consisting of $N_1$ (=5) tracks which are alternately selected (STEP 4 of the flowchart of FIG. 30).

In the search data areas, the data Ta which are obtained by highly compressing the data portion of the video data T of one frame at time t which corresponds to the upper half of the screen are recorded in 5 tracks in the search data areas 200, 202, 204, 206, and 208, and the data Tb which are obtained by highly compressing the data portion of the video data T which corresponds to the lower half of the screen are then recorded in 5 tracks in the search data areas 210, 212, 214, 216, and 218. Thereafter, the data (T+1)a which are obtained by highly compressing the data portion of the video data (T+1) of one frame at time (t+1) which corresponds to the upper half of the screen are recorded in 5 tracks in the search data areas 220 to 228. The operations are sequentially repeated. When the screen division number is M, an image of one frame is recorded in tracks the number of which is $M \times N_1 = 10$ and which have the same azimuth angle, in the search data areas. In the tracks, as a result, the update period S of the image recorded in the search data areas is $S = 2 \times M \times N_1$ (=20 tracks).

Next, reproduction will be described with reference to FIG. 15. Record data on the tape 5 are reproduced by the heads 2 and then amplified by the head amplifier 13. The record data are demodulated by the demodulator 58 and then subjected in the decoder for error correction 59 to error correction, extraction of a header, judgment of a SYNC block number, etc. Thereafter, the record data are divided into data for normal speed reproduction and search data in the deformatter 60. In normal speed reproduction, the search data and information added in recording operation are removed from the reproduced signal, and the reproduced signal is then supplied to the decoder for normal speed reproduction 61. In search speed reproduction, one SYNC block of one track set V having the same search data is sometimes subjected to a plurality of reproduction processes. In such a case, it is judged from the information written in the header whether the signal in the SYNC block indicates the search data or not. From the signal for identifying the SYNC block number and track set of the reproduced signal, it is then judged whether the same search data have been subjected to a plurality of reproduction processes or not. In the case where the same search data have been subjected to two or more reproduction processes, when the rate of errors of the search data reproduced in the second and subsequent reproduction processes are lower than a reference error rate, the search data of the previous process are replaced with those of the present process. The search data which are determined in this way are sent to the decoder for search 62.

As information for judging the search data, the SYNC block number or the like may be used. As the signal for identifying the track set, a signal may be used which is obtained by previously recording information relating to the numbering of the track set or a signal the level of which is inverted for every track set, into the header, the AUX area, or the like, and then reproducing the information. The judgment on whether the search data are to be replaced or not may be based on a comparison between errors of the search data in the previous process and those in the present process. Alternatively, the operation may be modified so that, when the SYNC block number is correctly reproduced, the replacement of the search data is conducted.

The data for normal speed reproduction and the search data are demodulated by the decoder for normal speed reproduction 61 and the decoder for search 62, respectively. In normal speed reproduction, the switch 63 selects an output of the decoder for normal speed reproduction 61, and, in search speed reproduction at the reference speed for search speed reproduction, selects an output of the decoder for search 62.

Next, the method of reproducing the search data areas will be described.

It is assumed that the gap length of each head 2 (the head width Tw) is equal to the track pitch Tp. FIG. 17A is a plan view of the tape 5 showing the track pattern, FIG. 17B is an enlarged view of the search data areas, and FIG. 17C is a plan view of the rotary drum showing the head arrangement. The scanning loci of the heads 2c and 2b in $N_1$-fold speed (=5-fold speed) reproduction are indicated by 500 and 201, respectively. In 5-fold speed reproduction, with respect to $N_1$ (=5) tracks having the R-azimuth angle, each of the heads 2c and 2b having the R-azimuth angle is surely caused to scan one time the search data areas as shown in FIG. 17A, by controlling the speed of the tape 5 by the capstan motor 7 shown in FIG. 1 (STEP 5 of the flowchart of FIG. 30). As shown in the enlarged view of FIG. 17B, data A which are obtained by compressing the video data T at time t which corresponds to the upper or lower half of the screen are recorded with being divided into a plurality of data groups, into the tracks of the R-azimuth angle in the search data areas. In the embodiment, for example, the data A are divided into 5 data groups A1, A2, A3, A4, and A5 and then recorded.

In FIG. 17A, when the head 2c scans along the scanning locus 500, the data group A1 is reproduced, and, when the head 2b scans along the scanning locus 501, the data groups A2, A3, A4, and A5 are reproduced. Consequently, all the effective data which are recorded in the search data areas of the tracks having the R-azimuth angle which is the same as the azimuth angle of the head 2c can be complementarily reproduced by the scans of the heads 2c and 2b. As a result of sequentially repeating such scans, even when the positional relationships between the heads and the record tracks are not controlled by the capstan motor 7, all the effective data which are recorded in the search data areas of tracks having the R-azimuth angle can be complementarily reproduced by two scans in total conducted by the head 2c or 2b. Since the search data areas of a track set consisting of $N_1$ tracks having the same azimuth angle are collectively located at the same position on the tracks, reproduction is hardly affected by track bending.

Figure 18A:
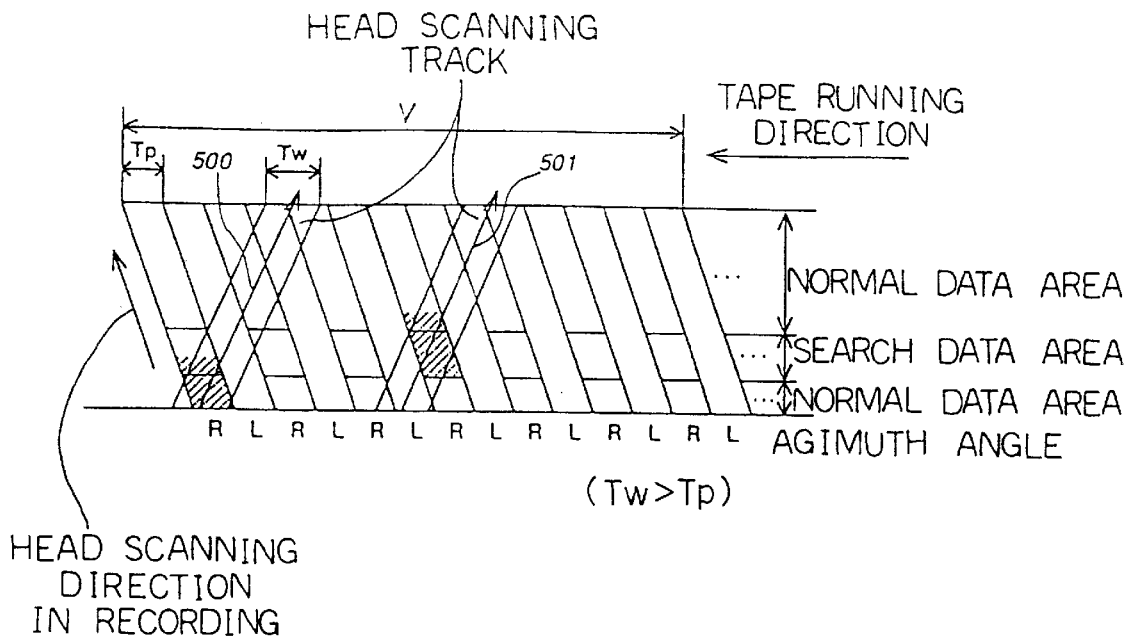
FIG. 18A is a plan view of a tape showing the track pattern in the fourth embodiment of the invention in the case where the head width is greater than the track pitch.

The case where the gap length of each head 2 (the head width Tw) is greater than the track pitch Tp will be described with reference to FIGS. 18A and 18B. The following description is irrespective of the arrangement and number of the heads. FIG. 18A is a diagram of the track pattern in the case where the head width Tw is greater than the track pitch Tp, and FIG. 18B is an enlarged view of the search data areas in this case.

It is assumed that, when the head 2c scans a area which is larger than a half of the record track width, data recorded on the tape 5 can be reproduced at an error rate which is not higher than a predetermined one. In the case where the head width Tw is equal to the track pitch Tp, as shown in FIGS. 17A and 17B, the data group A can be reproduced from the scanning locus 500 of the head 2c and the data groups A2, A3, A4, and A5 can be reproduced from the scanning locus 501 of the head 2b.

Figure 18B:
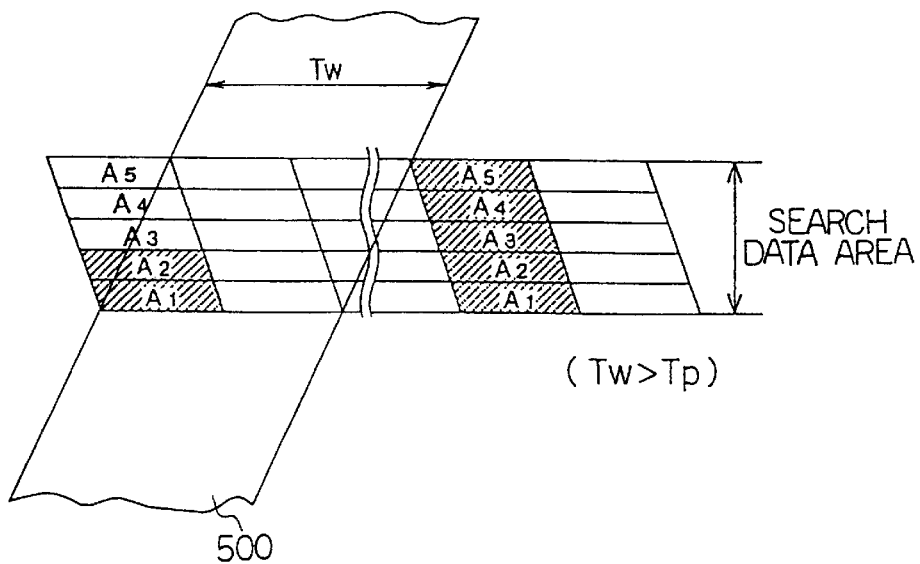
FIG. 18B is a plan view of a tape showing search data areas in the fourth embodiment of the invention in an enlarged manner in the case where the head width is greater than the track pitch.

In the case where the head width Tw is greater than the track pitch Tp, as shown in FIGS. 18A and 18B, the data groups A1 and A2 can be reproduced from the scanning locus 500 of the head 2c and the data groups A1, A2, A3, A4, and A5 can be reproduced from the scanning locus 501 of the head 2b. As a result, the data groups A1 and A2 are reproduced two times. Consequently, the redundancy of reproduced data is increased so that, in the case where the reproduction outputs of the heads 2c and 2b are relatively low in level, the reliability of data is improved. Furthermore, influence due to deviation in scanning locus of the heads which may be caused by the speed variation of the tape 5, the irregular rotation of the rotary drum, or the like can be compensated.

In the above, the embodiment having a head configuration in which the heads having the same azimuth angle are located at a central angle of 180° has been described. In the case where the positional relationship between a record track and a head is deviated by the track pitch Tp with respect to one head and the other head, also a head configuration other than the above-mentioned one can attain the same effects.

In the embodiment described above, search speed reproduction is conducted in the forward direction. Also search speed reproduction in the rearward direction along which the tape 5 runs reversely can be realized in a similar manner.

In the embodiment, the search data areas are disposed only in the tracks of the R-azimuth angle. Similarly, a plurality of heads of the L-azimuth angle may be provided and search data areas may be disposed in tracks which are recorded by heads of the L-azimuth angle (hereinafter, such a track is referred to as "L-azimuth track").

In the embodiment, one search data area is collectively disposed at one position. Alternatively, one search data area may be disposed with being distributed at a plurality of positions in one track.

A search data area may be divided in an arbitrary manner in one track, and the divided search data areas may be different in size from each other.

In the embodiment, the search data areas are disposed so as to correspond to at one reference speed for search speed reproduction. Alternatively, a plurality of search data areas can be disposed so as to correspond to a plurality of reference speeds for search speed reproduction. In the alternative, in each of the search data areas, the reference speed for search speed reproduction, the number of tracks constituting a track set, the number of screen division, and the size of the search data areas may be arbitrarily set.

The search data areas are disposed in $N_1$ tracks which are alternately selected. In the case where redundancy is insignificant, the search data areas may be disposed in $N_1$ or more tracks which are alternately selected.

As described above, in the second embodiment, a normal data area which is used in normal speed reproduction, and a plurality of search data areas which are used in search speed reproduction are disposed in one track. The reference speed for search speed reproduction is set to be $N_1$ (where $N_1$ is an odd number), and the same data are recorded in the search data areas of a track set consisting of $N_1$ or more tracks having the same azimuth angle. As a result, each of the heads 2a and 2c scans one time the track set. Therefore, it is not required to select a track to be scanned and to control the phase of the capstan motor 7, so that the mode is smoothly shifted from normal speed reproduction to search speed reproduction. Furthermore, all the effective data of the search data areas can be complementarily reproduced by two scans in total or reproduced by either of two scans, with the result that search speed reproduction of a high image quality can be realized by using search data of a simple arrangement.

When the reference speed for search speed reproduction is set to be $N_1$-fold speed (where $N_1$ is an odd number), all search data recorded in the search data areas can be reproduced in $N_x$-fold speed reproduction which is between $-N_1$-fold or more speed and $N_1$-fold and below speed (where $N_x$ is an odd integer which is not smaller than $-N_1$ and not larger than $+N_1$). Although image is slowly updated, it is possible to display an image. Even at a reproduction speed other the above-mentioned speeds or in a transient state during a shift of the reproduction speed, furthermore, a part of search data can be reproduced so that an image is displayed.

In the above, video data which are obtained by dividing the screen of one frame into two areas, upper and lower halves are recorded in the search data areas. Alternatively, video data may be intraframe-compressed so as to be separated into DC and AC components. The screen may be divided in horizontal direction, the screen may be divided into blocks of an arbitrary size, the number of screen division may be increased, and the screen may not be divided.

As video data to be recorded in the search data areas, it is preferable to use those of the frame which is latest at the timing when data forming each search data is recorded. Previous video data may be arbitrarily selected. In the case where, in generation of data for normal speed reproduction, the technique of interframe compression in which data in a plurality of frames are compressed is used together with intraframe compression in which data in one frame is compressed, for example, search data may be generated from video data which precede the timing when data forming each search data are recorded and are intraframe compressed, and the search data may be recorded in the search data area.

In the third embodiment, the reference speed for search speed reproduction is set to be $N_1$ (where $N_1$ is an odd number), and the same data are recorded in the search data areas of a track set consisting of $N_1$ or more tracks having the same azimuth angle. In the case where a plurality of heads having at least one of the L- and R-azimuth angles are disposed and heads of different azimuth angles record one track for two revolutions of the rotary drum, it is preferable that the reference speed for search speed reproduction is set to be $2 \times N_L$ (where $N_L$ is an odd number) and a track set consists of $N_1$ tracks having the same azimuth angle.

Similarly, in the case where two heads having the R-azimuth angle and two heads having the L-azimuth angle are mounted on the rotary drum 1 and two record tracks of the same azimuth angle are recorded for one revolution of the rotary drum, it is preferable that the reference speed for search speed reproduction is set to be $N_H/2$-fold speed (where $N_H$ is an odd number) and a track set consists of $N_H$ tracks having the same azimuth angle. In other words, at a certain speed for search speed reproduction, the same data are recorded in the search data areas of tracks of the same azimuth angle which are recorded by the heads for one revolution of the rotary drum 1. At this time, with respect to at least two heads of plural heads having the same azimuth angle, the positional relationships between the heads and the record tracks must be deviated from each other by about one track pitch Tp.

Fifth Embodiment

FIG. 19A is a plan view of the tape 5 showing an example in which the search data areas in the fifth embodiment are disposed in tracks of R- and L-azimuth angles, and FIG. 19B is a plan view of the rotary drum showing the head arrangement in this example. The heads 2c and 2b have the R-azimuth angle and the heads 2a and 2d the L-azimuth angle. The heads having the same azimuth angle are disposed at a central angle of 180°. The height differences among the heads 2a, 2b, 2c, and 2d are substantially zero.

Referring to FIG. 19A, the reference speed for search speed reproduction is $N_1$-fold speed (=5-fold speed). In the search data areas, the data Ta which are obtained by highly compressing the data portion of the video data T of one frame at time t which corresponds to the upper half of the screen are recorded in the search data areas 200, 202, 204, 206, and 208 of the track set V consisting of 5 tracks having the R-azimuth angle. The data Tb which are obtained by highly compressing the data portion of the video data T which corresponds to the lower half of the screen are recorded in the search data areas 201, 203, 205, 207, and 209 of the track set V consisting of 5 tracks having the L-azimuth angle. The operations are sequentially repeated.

Also in this data arrangement, in the same manner as described in conjunction with FIG. 16, all the effective data of the search data areas 200 to 208 of the tracks of the R-azimuth angle can be always complementarily reproduced by one scan of both the heads 2c and 2b or reproduced by either of two scans in total of the heads 2c and 2b. Similarly, all the effective data of the search data areas 201 to 209 of the tracks of the L-azimuth angle can be always complementarily reproduced by one scan of both the heads 2a and 2d or reproduced by either of two scans in total of the heads 2a and 2d. When the number of screen division is M, an image of one frame is recorded in $M \times N_1$ (=10) tracks, in the search data areas. The update period S of an image which is recorded in the search data areas in tracks is $S=M \times N_1$ (=10 tracks), and images of 10 tracks are simultaneously updated. As a result, in $N_1$-fold speed search reproduction, the update period of image can be shortened.

As described above, search data areas may be formed in tracks of R- and L-azimuth angles. In this case, the image update period in search speed reproduction can be shortened. Furthermore, the data rate of data for normal speed reproduction can be increased so that an improved image quality is obtained.

In the embodiment, the same reference speed for search speed reproduction is set in both the search data areas of the R-azimuth angle and those of the L-azimuth angle. Alternatively, different reference speeds for search speed reproduction may be set in search data areas so that the range of the speed for search speed reproduction is widened.

In the search data areas of the R- and L-azimuth angles in $2 \times N_1$ or more tracks, data of both the search data areas are simultaneously updated for each track set V. In each search data area, the data update position can be arbitrarily determined. The data update position in the search data area of the R-azimuth angle may be different from that in the search data area of the L-azimuth angle.

Figure 20A:
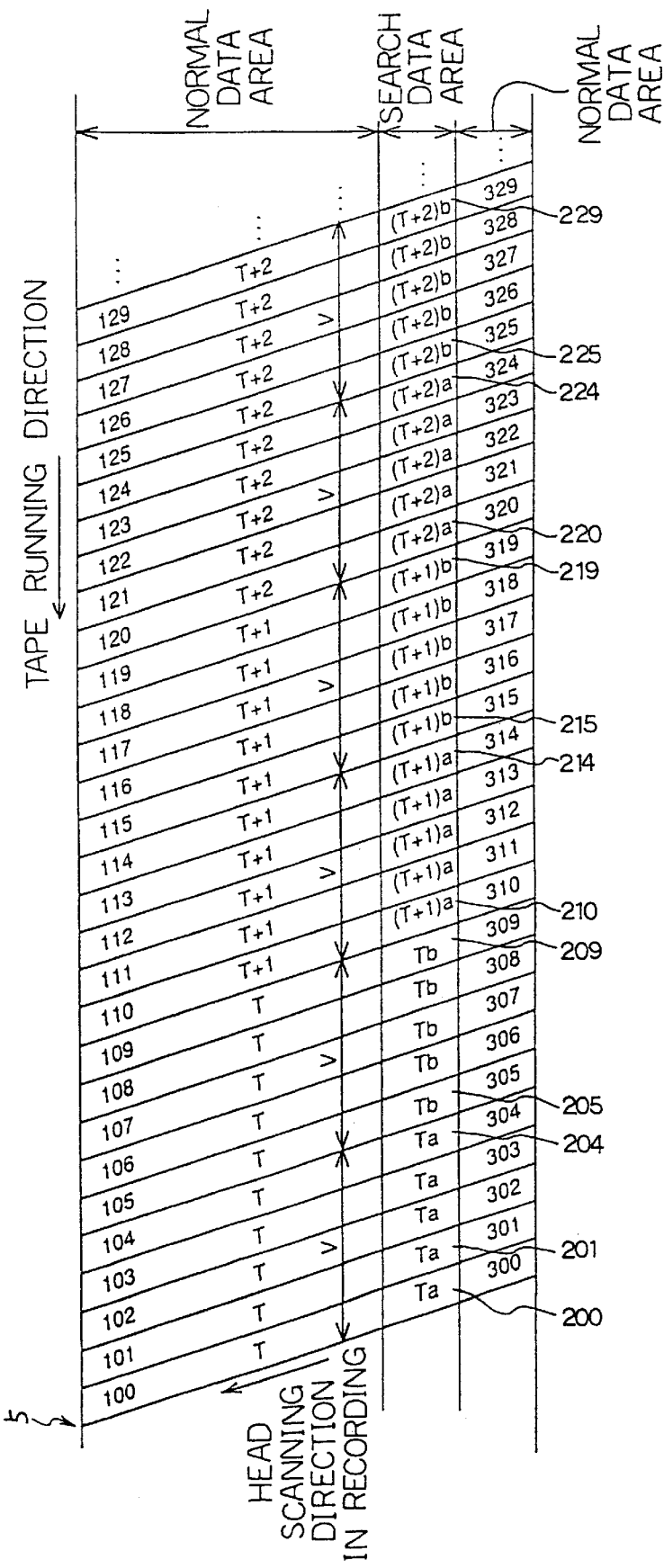
FIG. 20A is a plan view of a tape showing a second example of the track pattern in the fourth embodiment of the invention in the case where search data areas are disposed in tracks of R- and L-azimuth angles.
Figure 20B:
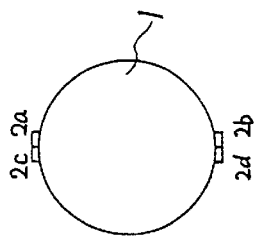
FIG. 20B is a plan view of the rotary drum showing a second example of the head arrangement in the fourth embodiment of the invention in the case where search data areas are disposed in tracks of R- and L-azimuth angles.

FIG. 20A is a plan view of the tape 5 showing another example in which the search data areas in the fourth embodiment are disposed in tracks of R- and L-azimuth angles. FIG. 20B is a plan view of the rotary drum showing the head arrangement in this example. The heads 2c and 2b have the R-azimuth angle and the heads 2a and 2d the L-azimuth angle. The heads having the same azimuth angle are disposed at a central angle of 180°. The heads 2c and 2a and the heads 2b and 2d are adjusted in height so that the head 2c and 2a scan the same locus and the head 2b and 2d scan the same locus of the tape.

Referring to FIG. 20A, the reference speed for search speed reproduction is $N_2$-fold speed (=5-fold speed) (where $N_2$ is an integer). In the search data areas, the data Ta which are obtained by highly compressing the data portion of the video data T of one frame at time t which corresponds to the upper half of the screen are recorded in the search data areas of the track set V consisting of continuous $N_2$ (=5) tracks. The data Tb which are obtained by highly compressing the data portion of the video data T which corresponds to the lower half of the screen are recorded in the search data areas of the next track set V. The operations are sequentially repeated.

Also in this data arrangement, in the same manner as described in conjunction with FIG. 16, either of the sets of the heads 2c and 2a and the heads 2b and 2d surely scans one time a track set consisting of $N_2$ (=5) tracks in $N_2$-fold speed (=5-fold speed) reproduction. In the case where the set of the heads 2c and 2a conducts the scan, for example, all the effective data of the search data areas of 5 tracks can be always complementarily reproduced by one scan of both the heads 2c and 2b. Moreover, all the effective data of the search data areas can be reproduced by a scan of either of the heads 2c and 2b. Also in the case where the set of the heads 2b and 2d conducts the scan, the above is also applicable.

When the number of screen division is M, an image of one frame is recorded in the search data areas of continuous tracks of the number of $M \times N_2$ (=10). The update period S in tracks of an image which is recorded in the search data areas is $M \times N_2$ (=10 tracks). As a result, the image update period can be shortened.

As described above, a normal data area which is used in normal speed reproduction, and a plurality of search data areas which are used in search speed reproduction are disposed in one track. The reference speed for search speed reproduction is set to be $N_2$-fold (where $N_2$ is an integer), and the same data are recorded in the search data areas of a track set consisting of continuous $N_2$ or more tracks. As a result, either of the sets of the heads 2c and 2a and the heads 2b and 2d surely scans one time the track set. Therefore, all the effective data of the search data areas can be complementarily reproduced by scans of the two heads without controlling the phase representing renolertion control of the capstan motor 7. All the effective data of the search data areas are produced by the scan of either of the two heads. The search speed reproduction of a high image quality in which the image update period is short can be realized.

Sixth Embodiment

Hereinafter, a sixth embodiment of the invention will be described with reference to FIGS. 21 and 22. The recording and reproducing apparatus and normal data areas in the sixth embodiment are the same as those of the fourth embodiment, and hence their description is omitted.

In the sixth embodiment, the reference speed for search speed reproduction is 3.5-fold speed ($N_3+0.5$, where $N_3=3$).

Figure 21:
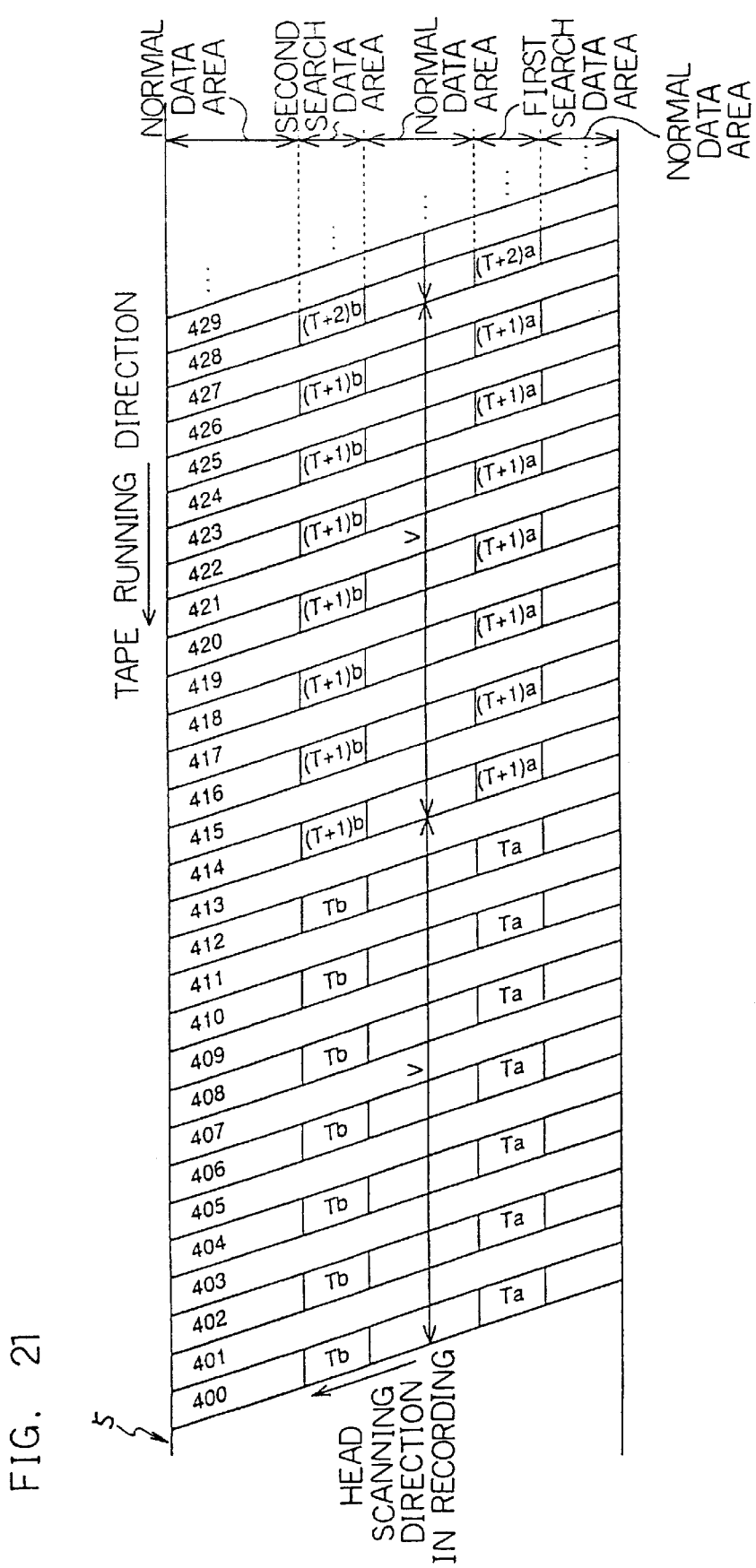
FIG. 21 is a plan view of a tape showing the track pattern in a fifth fourth embodiment of the invention.

FIG. 21 shows the track pattern in the fifth embodiment of the invention. Data for normal speed reproduction are recorded by the formatter 53 shown in FIG. 15 in normal data areas of tracks 400 to 429. Search data for the reference speed for search speed reproduction ($N_3+0.5$)-fold speed (3.5-fold speed) are recorded in first and second search data areas of the tracks 400, 402, . . . , 428. The same data are recorded in the first and second search data areas of a track set V consisting of ($2×N_3+1$) (=7) tracks having the same azimuth angle.

The distance between the centers of the first and second search data areas in the longitudinal direction of a track is set to be in the vicinity of an even-number multiple of the length of a portion of a record track which the heads cross in the longitudinal direction in ($N_3+0.5$)-fold speed reproduction. The search data areas are smaller in size than a area of a track from which data of the record track can be reproduced by the heads in ($N_3+0.5$)-fold speed reproduction.

Data Ta which are obtained by highly compressing the data portion of the video data T of one frame at time t which corresponds to the upper half of the screen are recorded in the first search data areas of the tracks 400, 402, . . . , 412 or ($2×N_3+1$) (=7) tracks. Data Tb which are obtained by highly compressing the data portion of the video data T which corresponds to the lower half of the screen are recorded in the second search data areas of the tracks 400, 402, . . . , 412 or ($2×N_3+1$) (=7) tracks. Next, data (T+1)a which are obtained by highly compressing the data portion of the video data (T+1) of one frame at time (t+1) which corresponds to the upper half of the screen are recorded in the first search data areas of the 7 tracks 414 to 426. The operations are sequentially repeated. When number of the screen division is M, therefore, an image of one frame is recorded in tracks the number of which is $M/2×(2×N_3+1)$ (=7) and which have the same azimuth angle, in the search data areas. In the tracks, the update period S of the image recorded in the search data areas is $2×M×(2N_3+1)$ (=14 tracks).

Next, the method of reproducing the search data areas will be described.

Figure 22A:
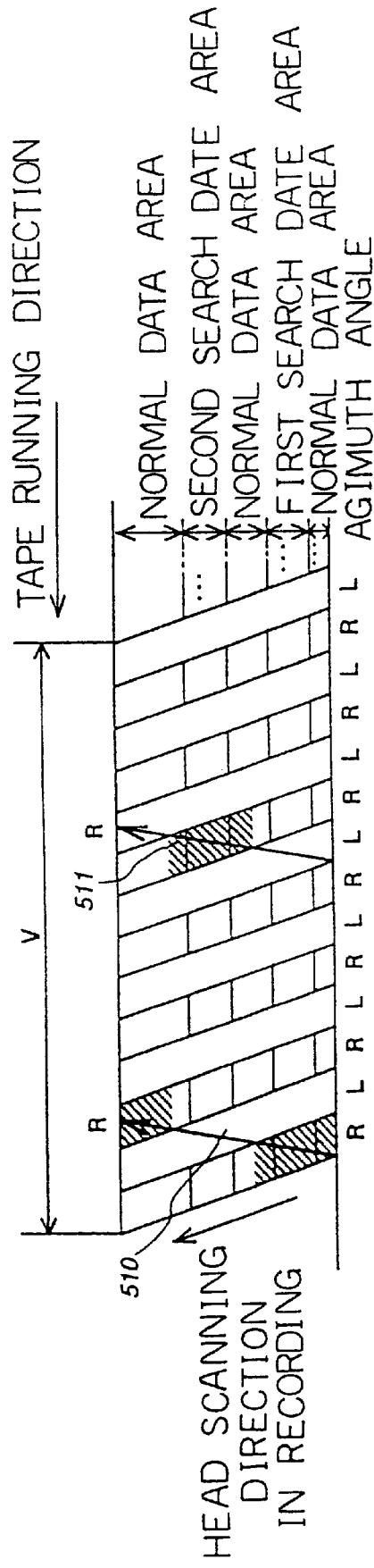
FIG. 22A is a plan view of a tape showing the track pattern in the fifth embodiment of the invention.
Figure 22B:
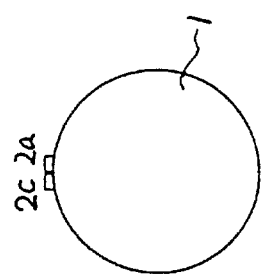
FIG. 22B is a plan view of a rotary drum showing the head arrangement in the fourth embodiment of the invention.

It is assumed that the gap length of each head (the head width Tw) is equal to the track pitch Tp. FIG. 22A is a plan view of the tape showing the track pattern, and FIG. 22B is a plan view of the rotary drum showing the head arrangement. The scanning locus of the head 2c in ($N_3+0.5$)-fold speed (3.5-fold speed) reproduction is indicated by 510 and 511. As seen from FIG. 22A, with respect to the track set V consisting of ($2×N_3+1$) (=7) tracks having the same azimuth angle, the head of the R-azimuth angle surely scans two times the first and second search data areas in the 3.5-fold speed reproduction. In the two scans of the head 2c, the rotation of the capstan motor 7 is controlled and the positional relationships between the head 2c and the record tracks are controlled so that the center of the reproduction area (the hatched portion in FIG. 22A) of the tracks of the R-azimuth angle from which the head 2c can reproduce record data substantially coincides with the center of the first or second search data area. In another method, the distance between the center of the first search data area and that of the reproduction area which reproduces the area is made equal to the distance between the center of the second search data area and that of the reproduction area which reproduces the area.

The point for locking the positional relationships may be obtained by means of calculation based on the tape format, or by searching the optimum point from the reproduced signal (for example, the SYNC block number which has been reproduced). This position control enables the heads to always scan the approximately central point of the search data areas. The difference between the center of the area from which the heads can reproduce record data in ($N_3+0.5$)-fold speed reproduction and that of the search data area is set as the margin of deviation in scanning locus of the heads. The margin can be arbitrarily set depending on the size of the search data area. In consideration of the head width and deviation in scanning locus, namely, the search data area of the optimum size can be set within the range from which the heads can reproduce record data in ($N_3+0.5$)fold speed reproduction. According to this configuration, even when deviation in scanning locus of the heads is caused by the speed variation of the tape 5, the irregular rotation of the rotary drum, or the like, search speed reproduction of a high image quality can be realized by using the heads having the width substantially equal to the track pitch.

When the reference speed for search speed reproduction is ($N_3+0.5$)-fold speed (where $N_3$ is an integer), in ($N_x+0.5$)-fold speed reproduction (where $N_x$ is an integer) of −($N_3+0.5$)-fold speed or more and ($N_3+0.5$)-fold speed and below at which the tape runs in the direction opposite to the running direction in normal speed reproduction, the area from which the heads can reproduce record data is larger than that in ($N_3+0.5$)-fold speed reproduction. Consequently, all search data recorded in the search data areas can be reproduced. Although image update is slow, it is possible to display an image. Also at a reproduction speed other the above-mentioned speeds or in a transient state during a shift of the reproduction speed, furthermore, a part of search data can be reproduced so that an image is displayed.

The search data areas are disposed in ($2×N_3+1$) tracks which are alternately selected. Although there arises a disadvantage that data reproduction is redundant, the search data areas may be disposed in ($2×N_3+1$) or more tracks which are alternately selected.

As described above, a normal data area which is used in normal speed reproduction, and a plurality of search data areas which are used in search speed reproduction are disposed in one track. The reference speed for search speed reproduction is set to be ($N_3+0.5$)-fold speed (where $N_3$ is an integer), and the same data are recorded in the search data areas of a track set consisting of ($2×N_3+1$) or more tracks having the same azimuth angle. When at ($N_3+0.5$)-fold speed the phase is controlled by the capstan motor 7, the heads 2c scans two times the search data areas of the track set. Consequently, all the effective data of the search data areas can be reproduced by the two scans. Since it is not required to select a track to be scanned, the mode is smoothly shifted from normal speed reproduction to search speed reproduction. Even heads which have the width substantially equal to the track pitch or a small tracking margin can realize search speed reproduction of a high image quality.

In the case where each head scans a track one time for two revolutions of the rotary drum, the reference speed for search speed reproduction is set to be $(2 \times N'_L + 1)$-fold speed (where $N'_L$ is an integer), and a track set consists of $(2 \times N'_L + 1)$ tracks having the same azimuth angle. In other words, at a certain speed for search speed reproduction, the same data are recorded in the search data areas of tracks of the same azimuth angle and in record tracks which are moved for two revolutions of the rotary drum. At this time, the positional relationships between the heads and the record tracks must be changed from each other by about one track pitch for one revolution of the rotary drum.

Seventh Embodiment

Figure 23A:
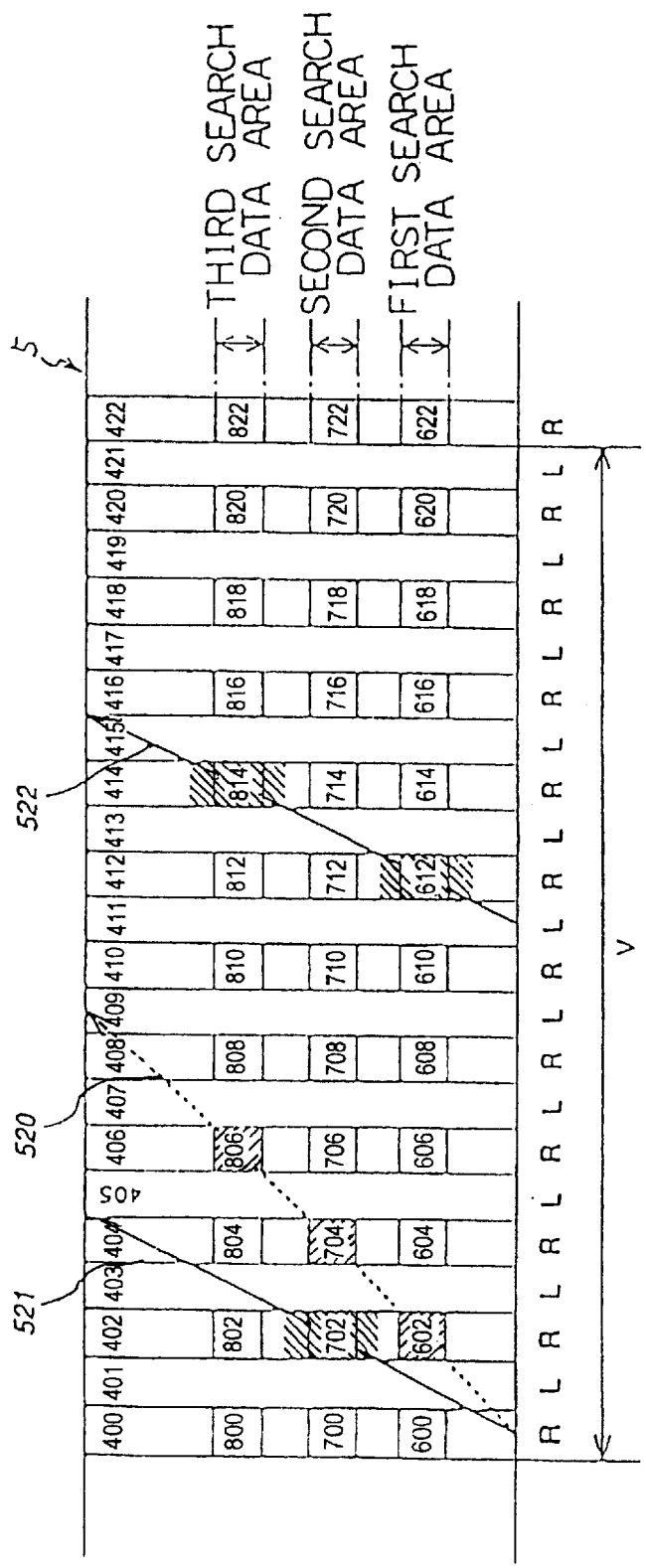
FIG. 23A is a plan view of a tape showing the track pattern in a sixth embodiment of the invention.
Figure 23B:
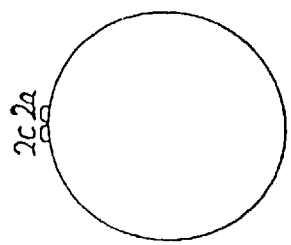
FIG. 23B is a plan view of a rotary drum showing the head arrangement in the sixth embodiment of the invention.

FIG. 23A is a plan view of the tape showing the track pattern in a seventh embodiment of the invention. FIG. 23B is a plan view of the rotary drum showing the head arrangement in the embodiment. The head 2c has the R-azimuth angle and the head 2a has the L-azimuth angle. The recording and reproducing apparatus and normal data areas in the embodiment are the same as those of the fourth embodiment, and hence their description is omitted.

Referring to FIG. 23A, the reference speed for search speed reproduction $N_3 + 0.5$ (where $N_3 = 5$) is 5.5-fold speed. The track 520 is a track along which the head 2c scans at $(2 \times N_3)$-fold speed (=10-fold speed). Search data areas are located on the track. In the embodiment, search data areas are disposed in three search data areas 602, 704, and 806 on the track 520. In the track set V consisting of $(2 \times N_3 + 1)$ tracks, first, second, and third search data areas are formed at the same positions as these search data areas, and the same data are recorded in search data areas. Each search data area has a size smaller than the region from which the heads can reproduce record data in $(2 \times N_3)$-fold speed reproduction.

In record, the video data T of one frame at time t are divided into three portions. First, the data Tc which are obtained by highly compressing the data portion which corresponds to the upper one third of the screen are recorded in first search data areas 600, 602, . . . , 620 of the track set V consisting of $(2 \times N_3 + 1)$ (=11) tracks having the same R-azimuth angle. The data Td which are obtained by highly compressing the data portion which corresponds to the middle one third of the screen of the video data T are recorded in second search data areas 700, 702, . . . , 720 of the track set V. The data Te which are obtained by highly compressing the data portion which corresponds to the lower one third of the screen of the video data T are recorded in third search data areas 800, 802, . . . , 820 of the track set V. The record operations are sequentially repeated.

Next, reproduction will be described. At $(N_3 + 0.5)$-fold speed (=5.5-fold speed), in the track set V consisting of $(2 \times N_3 + 1)$ (=11) tracks having the same azimuth angle, the head 2c surely conducts the scan two times. In the two scans of the head 2c, the rotation of the capstan motor 7 is controlled so that the center of the reproduction region (the hatched portion in FIG. 23A) of the tracks of the R-azimuth angle from which the head 2c can reproduce record data substantially coincides with the center of each search data area, thereby controlling the positional relationships between the head 2c and the record tracks. In another method, the positional relationships may be controlled so that the distance between the center of each search data area and that of the reproduction region which reproduces the search data area is minimum in the three search data areas. Such a control is referred to as "phase lock," and a positional relationship which is phase-locked is referred to as "a phase-locked point." The point where the phase is to be locked may be obtained by means of calculation based on the tape format, or by searching the optimum point from the reproduced signal such as the SYNC block number which has been reproduced.

The region from which the heads can reproduce record data at $(N_3 + 0.5)$-fold speed has a size larger than the region from which the heads can reproduce record data at $(2 \times N_3)$-fold speed. Therefore, all the effective data Tc, Td, and Te of the search data areas which are located at the three positions can be surely reproduced. At this time, in the search data areas, an image of one frame is recorded in $(2 \times N_3 + 1)$ (=11) tracks. In the tracks, the update period S of the image recorded in the search data areas is $(2 \times N_3 + 1)$ (=11) tracks.

Also in $(2 \times N_3)$-fold speed (=10-fold speed) reproduction, the positional relationships between the heads and the record tracks must be controlled. However, it is not required to select a specific track, all the effective data Tc, Td, and Te can be reproduced, and a reproduced image of a high quality can be obtained.

As described above, a normal data area which is used in normal speed reproduction, and a plurality of search data areas which are used in search speed reproduction are disposed in one track. The reference speed for search speed reproduction is set to be $(N_3 + 0.5)$ (where $N_3$ is an integer), and the same data are recorded in the search data areas of each track set consisting of $(2 \times N_3 + 1)$ or more tracks. The search data areas are located on the track along which the heads scan at $(2 \times N_3)$-fold speed, and the position is controlled by the capstan motor 7 in $2 \times N_3$-fold speed and $(N_3 + 0.5)$fold speed reproduction. As a result, all the effective data can be reproduced in $(2 \times N_3)$-speed and $(N_3 + 0.5)$ fold speed reproduction. Even when a track to be scanned is not selected, search speed reproduction of a high image quality at a plurality of speeds can be realized by using the heads having the width substantially equal to the track pitch.

When the reference speed for search speed reproduction is $(N_3 + 0.5)$-fold speed (where $N_3$ is an integer), in $(N_x + 0.5)$-fold speed reproduction (where $N_x$ is an integer which is not smaller than $-N_3$ and not larger than $+N_3$) $-(N_3 + 0.5)$-fold speed or more and $(N_3 + 0.5)$-fold speed and below, the region from which the heads can reproduce record data is larger than that in $(N_3 + 0.5)$-fold speed reproduction. Consequently, all search data recorded in the search data areas can be reproduced. Although image update is slow, it is possible to display an image. Also at a reproduction speed other than the above-mentioned speeds or in a transient state during a shift of the reproduction speed, furthermore, a part of search data can be reproduced and an image is displayed.

Figure 24:
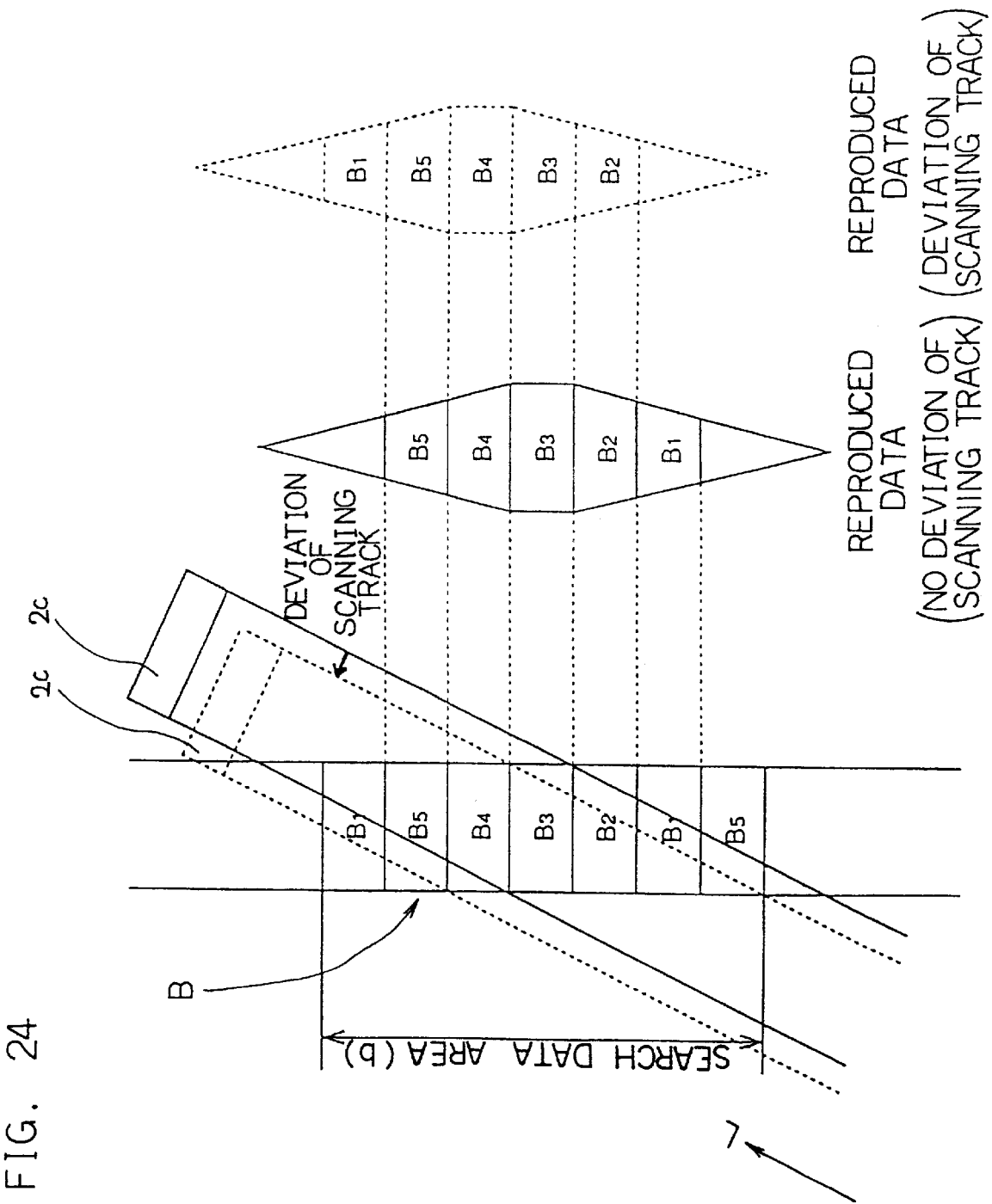
FIG. 24 is a plan view of a tape in the case where scans of search data areas are repeated in the longitudinal direction of a track.

In $(2 \times N_3)$-fold speed reproduction, track bending or the like sometimes causes deviation of scanning track of the heads so that all the search data cannot be reproduced. In such a case, data to be recorded in each search data area are repeatedly recorded in the longitudinal direction of a track, whereby tolerance for deviation of scanning track can be increased. The data which are repeatedly recorded in the longitudinal direction of a track may be a part of the data to be recorded in the search data area or the whole of the data. FIG. 24 is an enlarged view of an example of the search data area. In the figure, data are recorded in one search data area (B) with being divided into 5 data groups B1, B2, B3, B4, and B5. In the one search data area (B), the data groups B5, B1, B2, B3, B4, B5, and B1 are recorded in the longitudinal direction of a track indicated by the arrow L, or the data groups of the data B are recorded in a partly repeated manner. In reproduction, when there is no deviation of scanning track, the data B can be reproduced in the sequence of B1, B2, B3, B4, and B5 as indicated by solid lines. Even when scanning track is deviated from the original position as indicated by broken lines, all the data groups of the data B can be reproduced in the sequence of B2, B3, B4, B5, and B1. Consequently, the margin of deviation of scanning track can be increased by recording data to be recorded in the search data area, in a partly repeated manner. When the search data area can be made large, the data groups of the same data B are repeated plural times in the sequence of, for example, B1, B2, B3, B4, B1, B2, B3, and B4.

FIG. 25A is a plan view of the tape showing an example in which the search data areas in the embodiment are disposed in tracks of R- and L-azimuth angles, and FIG. 25B is a plan view of the rotary drum showing the head arrangement in this example. The head 2a has the L-azimuth angle and the heads 2b has the R-azimuth angle. The heads 2a and 2b are disposed at a central angle of 180 deg. The height difference between the heads 2a and 2b is substantially zero.

The reference speed for search speed reproduction $N_4$ is 4-fold speed. The reference speed for search speed reproduction $N_4$ indicates a reproduction speed which is an even-number multiple. The tracks 530 and 531 are tracks along which the heads 2b and 2a scan at $(2\times N_4-1)$-fold speed (=7-fold speed), respectively. The search data areas are located on the tracks. In the embodiment, for example, the search data areas are located in two areas 602 and 704 on the track 530. In the track set V consisting of $2\times N_4$ tracks, first and second search data areas are formed at the same positions as these search data areas. The same data are recorded in the search data areas in the track set V. The search data areas have a size smaller than a region from which the heads can reproduce record data in $(2\times N_4-1)$-fold speed reproduction.

Also in such a data arrangement, in the same manner as described in conjunction with FIG. 24, the heads 2a and 2b surely scan one time the search data areas of the track set V consisting of $2\times N_4$ continuous tracks. All the effective data of the search data areas of the tracks of the R-azimuth angle can be surely complementarily reproduced by one scan of both the heads 2a and 2b or reproduced by either of two scans in total of the heads 2a and 2b.

As described above, a normal data area which is used in normal speed reproduction, and a plurality of search data areas which are used in search speed reproduction are disposed in one track. The reference speed for search speed reproduction is set to be $N_4$ (where $N_4$ is an even number), and the same data are recorded in the search data areas of each track set consisting of $(2\times N_4)$ or more continuous tracks. The search data areas are recorded so as to be located on the track along which the heads scan at $(2\times N_4-1)$-fold speed in reproduction. At $(2\times N_4-1)$-fold speed and $N_4$-fold speed, the position is controlled by the capstan motor 7. As a result, all the effective data of the search data areas can be reproduced in $(2\times N_4-1)$-fold speed and $N_4$-fold speed reproduction. Even when a track to be scanned is not selected, therefore, search speed reproduction of a high image quality at a plurality of speeds can be realized by using the heads having the width substantially equal to the track pitch.

Eighth Embodiment

Figure 26A:
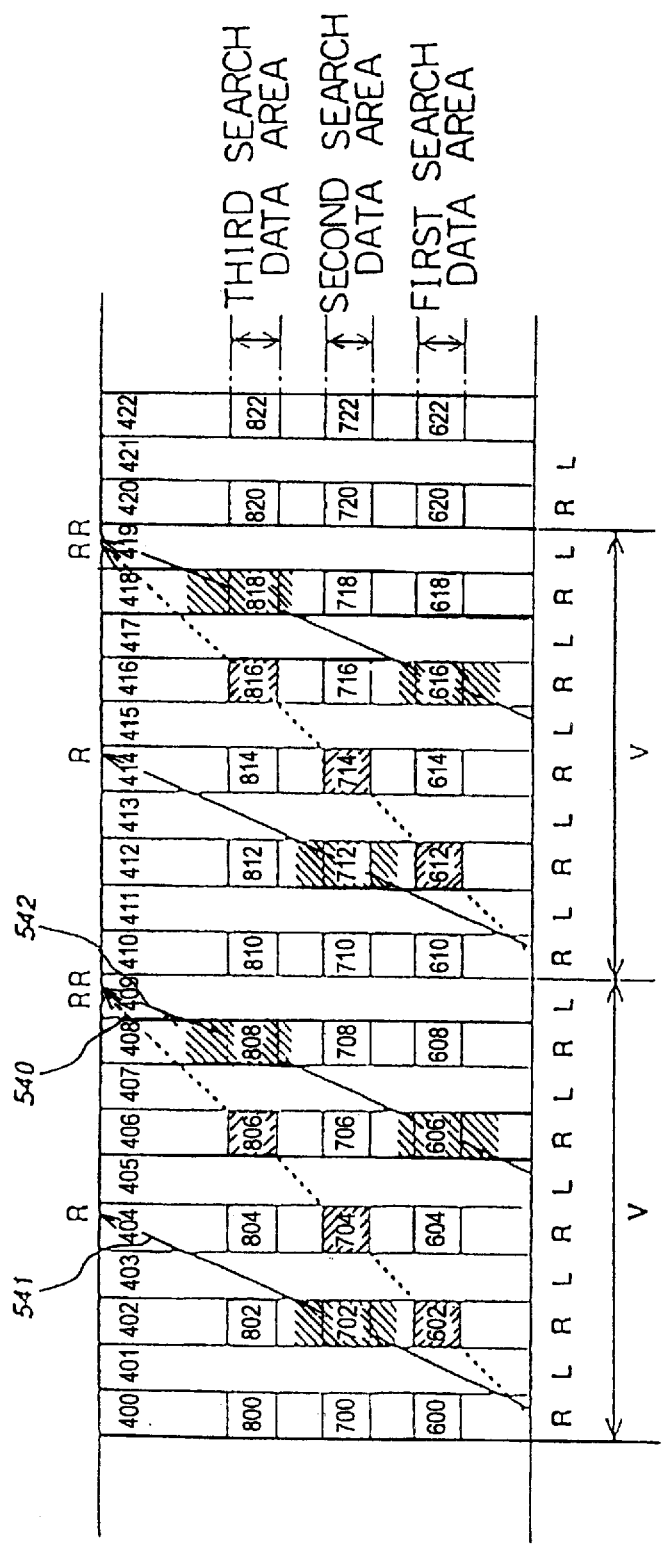
FIG. 26A is a plan view of a tape showing the track pattern in a seventh fifth embodiment of the invention.
Figure 26B:
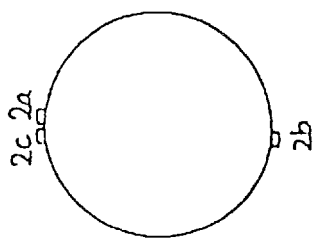
FIG. 26B is a plan view of a rotary drum showing the head arrangement in the seventh embodiment of the invention.

FIG. 26A is a plan view of the tape showing the track pattern in a eighth embodiment of the invention, and FIG. 26B is a plan view of the rotary drum showing the head arrangement in the embodiment. The head 2a has the L-azimuth angle and the heads 2c and 2b have the R-azimuth angle. The recording and reproducing apparatus and normal data areas in the eighth embodiment are the same as those of the first embodiment, and hence their description is omitted.

Referring to FIG. 26A, the reference speed for search speed reproduction $N_1$ is 5-fold speed. The track 540 is a track along which the heads 2c and 2b scan at $(2\times N_1)$-fold speed (=10-fold speed). Search data areas are located on the track. In the embodiment, for example, search data areas are disposed in three search data areas 602, 704, and 806 on the track 540. In the track set V consisting of $N_1$ tracks, first, second, and third search data areas are formed at the same positions as the search data areas 602, 704, and 806. The same data are recorded in the search data areas in the track set V. The widths of the heads 2c and 2b are approximately equal to the track pitch. Each search data area has a size smaller than the region from which the heads 2c and 2b can reproduce record data in $(2\times N_1)$-fold speed reproduction.

In record, the video data T of one frame at time t are divided into three portions in the same manner as the fourth embodiment. First, the data Tc which are obtained by highly compressing the data portion which corresponds to the upper one third of the screen are recorded in search data areas 600, 602, . . . , 608 of the track set consisting of $N_1$ (=5) tracks having the R-azimuth angle. The data Td which are obtained by highly compressing the data portion which corresponds to the middle one third of the screen of the video data T are recorded in search data areas 700, 702, . . . , 708. The data Te which are obtained by highly compressing the data portion which corresponds to the lower one third of the screen of the video data T are recorded in search data areas 800, 802, . . . , 808. The record operations are sequentially repeated.

Next, reproduction will be described.

In reproduction at $N_1$-fold speed (=5-fold speed), as shown by tracks 541 and 542, the head 2c surely scans two times the track set V consisting of $N_1$ (=5) tracks having the same azimuth angle. In the two scans, a phase-locked point which scans one time each of the three search data areas of the track set V always exists. The region from which the heads can reproduce record data at $N_1$-fold speed is larger than the region from which the heads can reproduce record data at $(2\times N_1)$-fold speed. Even when heads having the width substantially equal to the track pitch are used, therefore, all the effective data Tc, Td, and Te of the search data areas which are located at the three positions can be surely reproduced. At this time, in the search data areas, an image of one frame is recorded in $N_1$ (=5) tracks. The update period S in tracks and of an image which is recorded in the search data areas is $N_1$ (=5) tracks.

Also in $(2\times N)$-fold speed (=10-fold speed) reproduction, the positional relationships between the heads and the record tracks must be controlled. However, without requiring selection of a specific track, all the search data Tc, Td, and Te can be reproduced, and a reproduced image of a high quality can be obtained.

As described above, a normal data area which is used in normal speed reproduction, and a plurality of search data areas which are used in search speed reproduction are disposed in one track. The reference speed for search speed reproduction is set to be $N_1$ (where $N_1$ is an odd number), and the same data are recorded in the search data areas of each track set V consisting of $N_1$ or more tracks having the same azimuth angle. The search data areas are recorded on the track along which the heads scan at (2×N$_1$)-fold speed in reproduction. At (2×N$_1$)-fold speed and N$_1$-fold speed, the phase is controlled by the capstan motor 7. As a result, at reproduction speeds of (2×N$_1$)-fold speed and N$_1$-fold speed, all the effective data of the search data areas can be reproduced. Even when a track to be scanned is not selected, search speed reproduction of a high image quality at a plurality of speeds can be realized by using the heads having the width substantially equal to the track pitch.

When the reference speed for search speed reproduction is set to be N$_1$ (where N$_1$ is an odd number), in N$_x$-fold speed reproduction (where N$_x$ is an odd number) of −N$_1$-fold speed or more and N$_1$-fold speed and below, all the search data recorded in the search data areas can be reproduced. Although image update is slow, it is possible to display an image. Also at a reproduction speed other than the above-mentioned speeds or in a transient state during a shift to the reproduction speed, furthermore, a part of search data can be reproduced and an image is displayed.

In the same manner as the seventh embodiment, the margin of deviation of scanning track particularly in (2×N$_1$)-fold speed reproduction can be increased by recording data to be recorded in the search data area, in a partly repeated manner in the longitudinal direction of a track.

The search data areas are configured by 2×N$_1$ tracks which are alternately selected. In the case where redundancy is insignificant, the search data areas may be configured by 2×N$_1$ or more tracks which are alternately selected.

Ninth Embodiment

Figure 27:
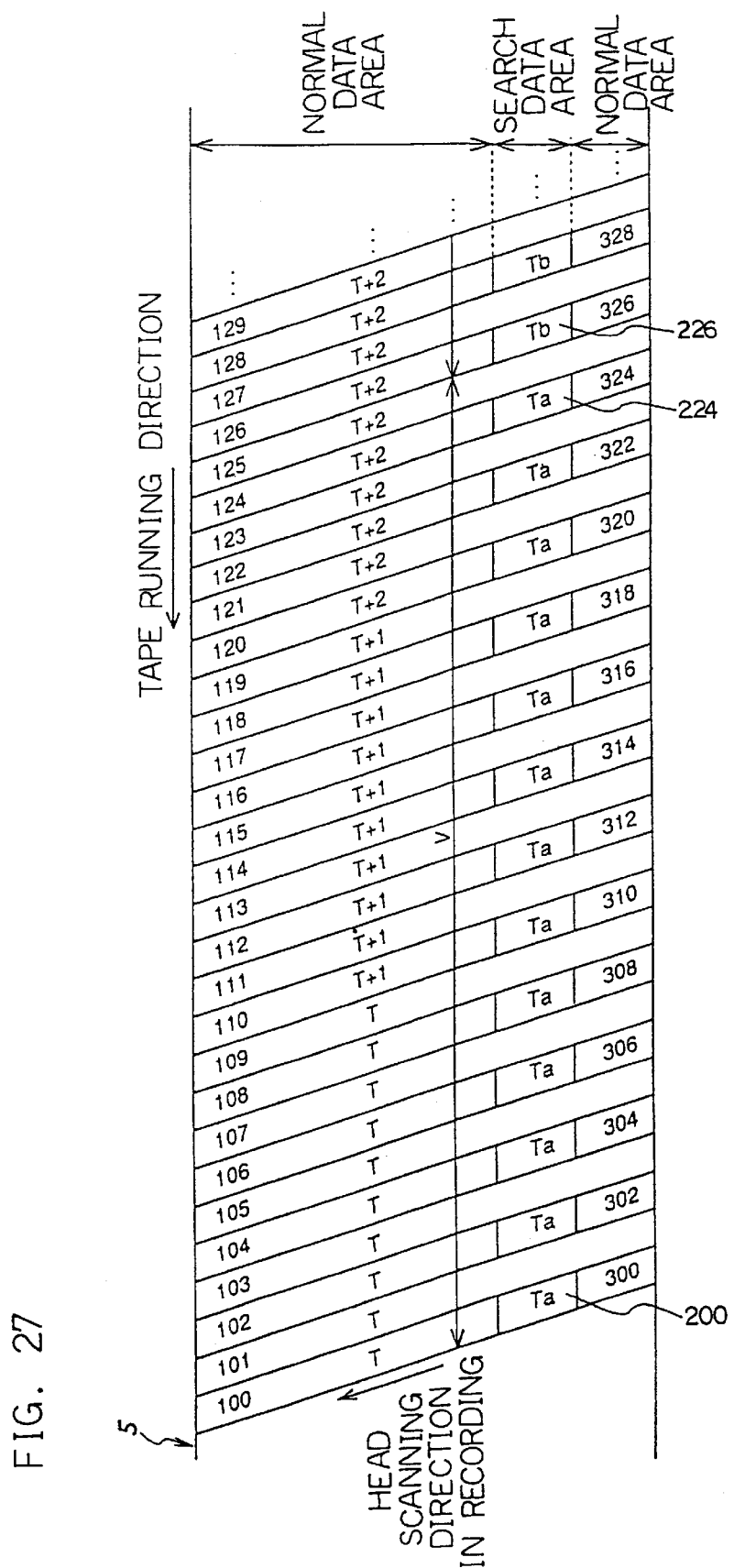
FIG. 27 is a plan view of a tape showing the track pattern in an eighth embodiment of the invention.

FIG. 27 is a plan view of the tape showing the track pattern in a ninth embodiment of the invention. The configuration of the recording and reproducing apparatus and normal data areas of the ninth embodiment are similar to those of the fourth embodiment. The search data areas are located in the same manner as those of the fifth embodiment.

As shown in FIG. 27, the same data Ta are recorded in the search data areas of the track set V consisting of K (=13) tracks (where K is an integer which is not less than 4) having the same azimuth angle. The speed for search speed reproduction is K/W-fold speed (where W is an integer which is not less than 3). When the screen division number M is set to be 2, in the search data areas, an image of one frame is recorded in M×K (=26) tracks having the same azimuth angle. In the tracks, the update period S of the image recorded in the search data areas is 2×M×K (=52) tracks.

Next, the method of reproducing the search data areas will be described.

Figure 28A:
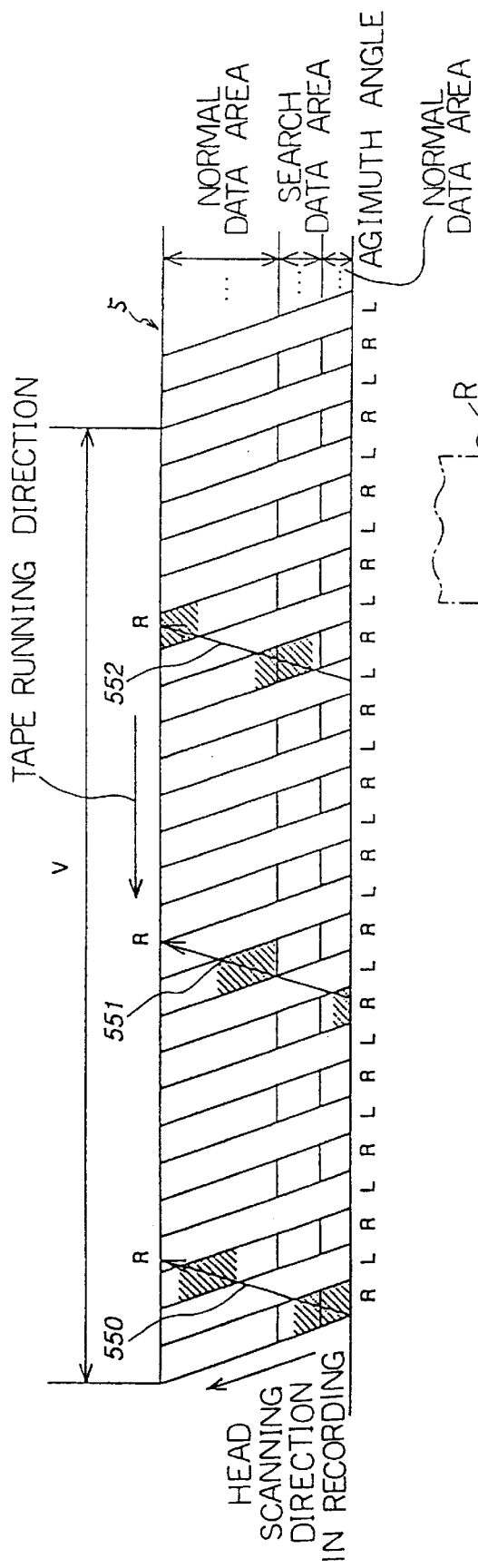
FIG. 28A is a plan view of a tape showing the track pattern in the eighth embodiment of the invention.
Figure 28C:
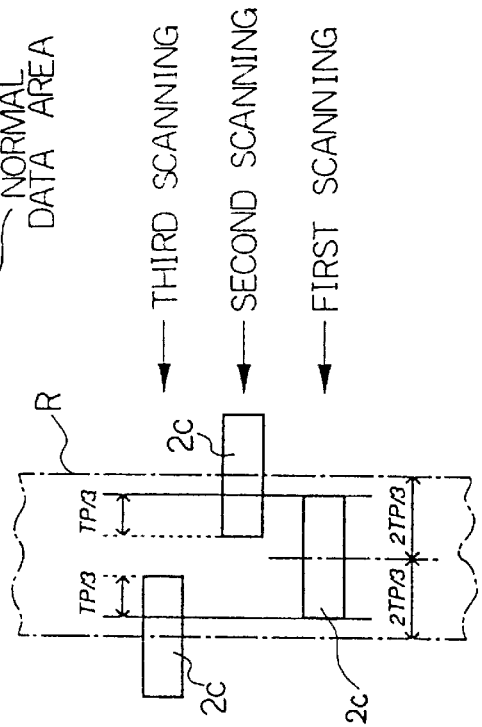
FIG. 28C is a diagram showing positional relationships of heads in the eighth embodiment of the invention.
Figure 28B:
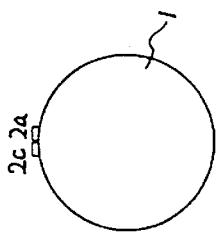
FIG. 28B is a plan view of a rotary drum showing the head arrangement in the eighth embodiment of the invention.

It is assumed that the gap length of each head (the head width Tw) is equal to the track pitch Tp. FIG. 28A is a diagram of the track pattern, FIG. 28B is a plan view of the rotary drum showing the head arrangement, and FIG. 28C is a view showing positional relationships of the heads. The scanning track of the head 2c in reproduction wherein the speed for search speed reproduction K/W is 13/3-fold speed (=4.33-fold speed, where K=13 and W=3) is indicated by 551 and 552. As seen from FIG. 28A, with respect to the K (=13) tracks having the same azimuth angle, the head 2c scans three times the track set V in 4.33-fold speed reproduction even when the rotation of the capstan motor 7 is not controlled. In the three scans, the head surely scans the whole of the search data areas.

As shown in FIG. 28C, the scanning track of the head 2c on the record track R of R-azimuth angle is deviated by one third of the track pitch Tp (Tp/3) for each scan. Therefore, the head 2c duplicately scans the region of the track from which record data can be reproduced. Specifically, when the head 2c having the width equal to the track pitch Tp is used, three scans of the head 2c on the track in which the same data are recorded relatively produce duplication which corresponds to one third of the track pitch Tp in the head width direction. This duplication width serves as the margin of deviation of scanning track of the head from the search data area. Even when deviation of scanning track occurs, therefore, all the data of the search data areas can be reproduced in reproduction wherein the speed for search speed reproduction K/W is 13/3-fold speed (=4.33-fold speed), by using the heads having the width substantially equal to the track pitch. In other words, even when the track bend, the speed variation of the tape, the irregular rotation of the rotary drum, or the like occurs, search speed reproduction of a high image quality can be realized by using the heads having the width substantially equal to the track pitch, without controlling the capstan motor 7.

In the same manner as the sixth embodiment, even when the speed for search speed reproduction is K/W (N$_y$+0.5)-fold speed (where N$_y$ is an integer), all the data of the search data areas can be reproduced by controlling the phases of the heads and the record tracks, with the result that a reproduced image of a high quality can be obtained. When heads having the width greater than the track pitch are used, all the data for search can be reproduced by controlling only the speed of the tape 5.

In the above, the embodiment in which reproduction is conducted at the K/W-fold speed for search speed reproduction wherein the integer W indicative of the speed for search speed reproduction is 3 has been described. Similarly, the same data are recorded at the same position of each track in the search data areas of the track set consisting of K tracks (where K is an integer which is not less than 4) having the same azimuth angle. As a result, when the ratio K$_x$/W (where K$_x$ is a positive integer which is not larger than K and W is an integer which is not less than 3) is not an integer, all search data recorded in the search data areas can be reproduced also in reproduction conducted at the K$_x$/W-fold speed for search speed reproduction wherein the speed for search speed reproduction is not lower than −K/W-fold speed and not higher than K/W-fold speed. Although image update is slow, it is possible to display an image. Also at a reproduction speed other than the above-mentioned speeds or in a transient state during a shift of the reproduction speed, furthermore, a part of search data can be reproduced and an image is displayed.

As described above, a normal data area which is used in normal speed reproduction, and a plurality of search data areas which are used in search speed reproduction are disposed in one track. The same data are recorded in the search data areas of a track set consisting of K or more tracks (where K is an integer which is not less than 4) having the same azimuth angle. The search data areas are located in a band-like region in each track which elongate in parallel with the tape running direction. As a result, when the ratio K/W is not an integer, all effective data of the search data areas can be reproduced in reproduction conducted at K/W-fold speed. Even when the heads having the width substantially equal to the track pitch are used, all effective data of the search data areas can be reproduced by W or more scans (where W is an integer which is not less than 3) without requiring the positional relationships between the heads and the record tracks to be controlled. As a result, search speed reproduction of a high image quality can be realized. Since the same data are commonly used in reproductions of different reproduction speeds, wasted search data can be reduced and the arrangement of search data can be simplified. Since it is not required to select a track to be scanned and control the positional relationships between the heads and the tracks, the mode can be smoothly shifted from normal speed reproduction to search speed reproduction.

Also in the case where two or more heads of the same azimuth angle are provided as in the fourth embodiment, the same data are recorded in the search data areas of a track set consisting of K or more tracks (where K is an integer) having the same azimuth angle. As a result, when 2×K/W is not an integer, all effective data of the search data areas can be reproduced by W scans in total of the heads of the same azimuth angle in reproduction conducted at a speed for search speed reproduction 2×K/W-fold speed.

Tenth Embodiment

FIG. 29A is a plan view of the tape showing the track pattern in a tenth embodiment of the invention. The configuration of the recording and reproducing apparatus, and arrangement of normal data areas and search data areas of the tenth embodiment are similar to those of the fourth embodiment, and hence their description is omitted.

In record, an AUX area which has a band-like shape and elongates in the tape running direction is formed in a part of each search data area. In a track where no search data area exists, the AUX area formed in a part of each search data area is extended in the tape running direction so that the AUX areas are located at the same positions of the tracks. In the AUX area, recorded are information of the record format (for example, the record mode), that of the signals recorded in the normal data areas (for example, the packet size, the date and time of record, and the elapsed time period), that of the signals recorded in the search data areas (for example, the number of tracks of the search data areas in which the same data are recorded, and the reference speed for search speed reproduction), etc. It is a matter of course that such information may be coded and then recorded. An analog signal may be recorded as it is. With respect to such information, it is not required to record the same information in all tracks of a track set consisting of $N_1$ (=5) tracks having the same azimuth angle. In one software (for example, a program of broadcasting), for example, the date and time of record are the same in all the tracks, but the elapsed time period may be different from each other in all the tracks.

In normal speed reproduction, since the heads trace the record tracks, all information recorded in the AUX areas can be reproduced.

Also in reproduction at the reference speed for search speed reproduction which is $N_1$-fold speed, since the AUX areas are disposed in the search data areas, information recorded in the AUX areas can be reproduced.

As described above, since the AUX areas are disposed in the search data areas, data recorded in the AUX areas can be reproduced in normal speed reproduction and search speed reproduction.

In the embodiment, the search data area is disposed at one position in the longitudinal direction of the tape. The search data area may be configured in an arbitrary manner. Also in the case where a plurality of search data areas are disposed in the longitudinal direction of the tape or the search data area is disposed in head scanning track at a certain speed for search speed reproduction, the same effects are attained when the AUX area is formed in a part of the search data area. When a plurality of search data areas are disposed for a plurality of speeds for search speed reproduction, the AUX area may be disposed in a part of the plurality of search data areas. When search data areas for different speeds for search speed reproduction are to be disposed in tracks of the R- and L-azimuth angles, for example, the AUX area is formed in the search data areas of the R- and L-azimuth angles. According to this configuration, information of the AUX area can be reproduced at these speeds for search speed reproduction. When the AUX area is formed at a position where the search data areas overlap with each other in the longitudinal direction of a track, the AUX area can be formed at a position which is always constant in the longitudinal direction of a track, so that the AUX area can be easily detected.

In the example described above, the AUX area is disposed in all tracks. Alternatively, the AUX area may be disposed at intervals of several tracks.

Figure 29:
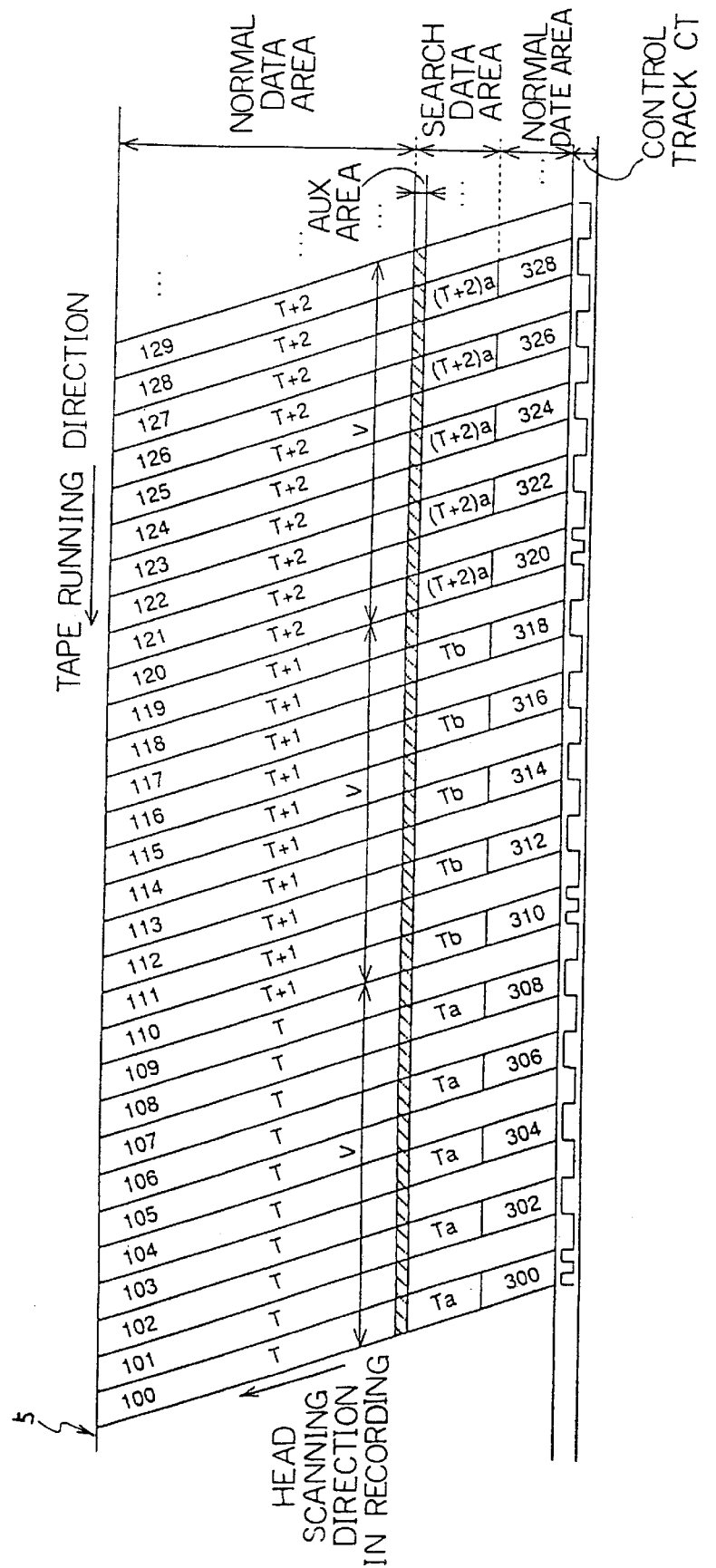
FIG. 29 is a plan view of a tape showing the track pattern in a ninth embodiment of the invention.

In the case where a control track CT for recording a control signal is disposed in the longitudinal direction of the tape 5, as shown in FIG. 29, the control signal is modulated by a predetermined signal at the boundary of the track set V. As a result, the boundary of the track set can be detected on the basis of the control signal. Even when a signal for identifying the track set V is not recorded, the track set V can be judged and hence search speed reproduction can be easily realized. In edition such as splicing, data can be easily protected in the unit of the track set V. As described as the prior art example, when also the system in which search data are disposed on the scanning track of a head is used in the track set V, the position of the track which is to be scanned for reproducing the search data is defined with respect to the start track of the track set V so that the delimitation of the track set is clarified by the modulated control signal. Consequently, the track to be scanned can be easily selected. The control signal may be modulated by an arbitrary method. When the start in search is accessed on the basis of the control signal, for example, modulation may be conducted in a method different from the above. When a plurality of search data areas which are different from each other in the number of tracks constituting the track V are disposed, the control signal is modulated in different methods and modulations of different methods may be applied to the delimitations of the track sets V of the search data areas, respectively.

In the above, the embodiments in which video data are recorded in the normal data areas and the search data areas have been described. Data such as video data, audio data, or additional information including time codes may be recorded. Different data are recorded in the plurality of search data areas. Alternatively, the same data may be recorded in the plurality of search data areas, thereby increasing the redundancy of the data so as to reduce errors.

The number of screen division can be arbitrarily set, and may be variable with using a track set or a search data area as a unit. In the embodiments, an image of one frame is first divided and then compressed. Alternatively, the image may be first compressed and then divided, or may not be compressed.

In each search data area, the reference speed for search speed reproduction, the image update position, the compression method, and the compression rate can be arbitrarily determined. It is possible to obtain optimum search speed reproduction image for a plurality of reference speeds for search speed reproduction.

In the embodiments described above, in the normal data areas and search data areas, tracks in which video data of one frame at a certain time are constant in number. Alternatively, variable-length coding may be conducted so that the number of tracks per frame and the size of a recorded area are variable.

What is claimed is:

1. A recording and reproducing apparatus comprising: tape driving means for driving a tape; a rotary drum around which the tape is to be slantly wound; and at least three heads including a first head, a second head, and a third head which are mounted on said rotary drum and which scan the tape to conduct a recording or reproducing operation, said first head having a first azimuth angle, said second and third heads having a second azimuth angle which is different from the first azimuth angle, said second and third heads being mounted on said rotary drum to be opposed to each other at a central angle of 180 degrees, said first head being located in the immediate neighborhood of said third head in a direction along the circumference of said rotary drum, and said apparatus recording and reproducing a plurality of signals of different data rates by using said first and second heads for recording and reproducing the signal of a first data rate, and by using said first and third heads for recording and reproducing the signal of a second data rate, wherein said first and second heads have a mutual positional relationship in which there is a first minute height difference ΔH1 that is intentionally provided in the rotation shaft direction of said rotary drum, and said first and third heads have a mutual positional relationship in which there is a second minute height difference ΔH2 that is intentionally provided in the rotation shaft direction of said rotary drum.

2. A recording and reproducing apparatus comprising: tape driving means for driving a tape; a rotary drum around which the tape is to be slantly wound; and at least three heads including a first head, a second head, and a third head which are mounted on said rotary drum and which scan the tape to conduct a recording or reproducing operation, said first head having a first azimuth angle, said second and third heads having a second azimuth angle which is different from the first azimuth angle, said second and third heads being mounted on said rotary drum to be opposed to each other at a central angle of 180 degrees, said first head being located in the immediate neighborhood of said third head in a direction along the circumference of said rotary drum, and said apparatus recording and reproducing a plurality of signals of different data rates, wherein said first and second heads have a mutual positional relationship in which there is a first minute height difference ΔH1 in the rotation shaft direction of said rotary drum, said first and third heads have a mutual positional relationship in which there is a second minute height difference ΔH2 in the rotation shaft direction of said rotary drum, and wherein when a track pitch is Tp, a minute difference in central angle exists between said first head and said third head in the direction along the circumference of said rotary drum which is θ degrees, and $M_2$ is a positive even number, said first and third heads have a mutual positional relationship in which the second minute height difference ΔH2 in the rotation shaft direction of said rotary drum is Tp×θ/(180×$M_2$), wherein $M_2$ is a positive even number, and said first and second heads have a mutual positional relationship in which the first minute height difference ΔH1 in the rotation shaft direction of said rotary drum is Tp×θ/180.

3. A recording and reproducing apparatus comprising: tape driving means for driving a tape; a rotary drum around which the tape is to be slantly wound; and at least three heads including a first head, a second head, and a third head which are mounted on said rotary drum and which scan the tape to conduct a recording or reproducing operation, said first head having a first azimuth angle, said second and third heads having a second azimuth angle which is different from the first azimuth angle, said second and third heads being mounted on said rotary drum to be opposed to each other at a central angle of 180 degrees, said first head being located in the immediate neighborhood of said third head in a direction along the circumference of said rotary drum, and said apparatus recording and reproducing a plurality of signals of different data rates, wherein said first and second heads have a mutual positional relationship in which there is a first minute height difference ΔH1 in the rotation shaft direction of said rotary drum, said first and third heads have a mutual positional relationship in which there is a second minute height difference ΔH2 in the rotation shaft direction of said rotary drum, and wherein when a track pitch is Tp, a minute difference in central angle exists between said first head and said third head in the circumferential direction of said rotary drum which is θ degrees, said first and third heads have a mutual positional relationship in which the second minute height difference ΔH2 in the rotation shaft direction of said rotary drum is Tp×θ/360, and said first and second heads have a mutual positional relationship in which the first minute height difference ΔH1 in the rotation shaft direction of said rotary drum is Tp×θ/180.

4. A recording and reproducing apparatus comprising: tape driving means for driving a tape; a rotary drum around which the tape is to be slantly wound; and at least three heads including a first head, a second head, and a third head which are mounted on said rotary drum and which scan the tape to conduct a recording or reproducing operation, said first head having a first azimuth angle, said second and third heads having a second azimuth angle which is different from the first azimuth angle, said second and third heads being mounted on said rotary drum to be opposed to each other at a central angle of 180 degrees, said first head being located in the immediate neighborhood of said third head in a direction along the circumference of said rotary drum, and said apparatus recording and reproducing a plurality of signals of different data rates by using said first and second heads for recording and reproducing the signal of a first data rate, and by using said first and third heads for recording and reproducing the signal of a second data rate, wherein said first and third heads have a mutual positional relationship in which said heads are at the same height in the rotation shaft direction of said rotary drum, and said first and second heads have a mutual positional relationship in which there is a minute height difference that is intentionally provided in the rotation of the shaft direction of said rotary drum.

5. A recording and reproducing apparatus comprising: tape driving means for driving a tape; a rotary drum around which the tape is to be slantly wound; and at least three heads including a first head, a second head, and a third head which are mounted on said rotary drum and which scan the tape to conduct a recording or reproducing operation, said first head having a first azimuth angle, said second and third heads having a second azimuth angle which is different from the first azimuth angle, said second and third heads being mounted on said rotary drum to be opposed to each other at a central angle of 180 degrees, said first head being located in to said third head in a direction along the circumference of said rotary drum, and said apparatus recording and reproducing a plurality of signals of different data rates, wherein said first and third heads have a mutual positional relationship in which said heads are at the same height in the rotation shaft direction of said rotary drum, and said first and second heads have a mutual positional relationship in which there is a minute height difference in the rotation shaft direction of said rotary drum, and wherein when a track pitch is Tp, a minute difference in central angle exists between said first head and said third head in the direction along the circumference of said rotary drum which is θ degrees, and $M_1$ is a positive odd number, and said first and second heads have a mutual positional relationship in which the minute height difference in the rotation shaft direction of said rotary drum is $Tp \times \theta/(180 \times M_1)$, wherein $M_1$ is a positive odd number.

6. A recording and reproducing apparatus comprising: tape driving means for driving a tape; a rotary drum around which the tape is to be slantly wound; and at least three heads including a first head, a second head, and a third head which are mounted on said rotary drum and which scan the tape to conduct a recording or reproducing operation, said first head having a first azimuth angle, said second and third heads having a second azimuth angle which is different from the first azimuth angle, said second and third heads being mounted on said rotary drum to be opposed to each other at a central angle of 180 degrees, said first head being located in the immediate neighborhood of said third head in a direction along the circumference of said rotary drum, and said apparatus recording and reproducing a plurality of signals of different data rates, wherein said first and third heads have a mutual positional relationship in which said heads are at the same height in the rotation shaft direction of said rotary drum, and said first and second heads have a mutual positional relationship in which there is a minute height difference in the rotation shaft direction of said rotary drum, and wherein when a track pitch is Tp, a minute difference in central angle exists between said first head and said second head in the circumferential direction of said rotary drum which is θ degrees, and said first and second heads have a mutual positional relationship in which the minute height difference in the rotation shaft direction of said rotary drum is $Tp \times \theta/180$.

7. A recording and reproducing apparatus comprising: tape driving means for driving a tape; a rotary drum around which the tape is to be slantly wound; and at least three heads including a first head, a second head, a third head which are mounted on said rotary drum and which scan the tape to conduct a recording or reproducing operation, and a head control unit, said first head having a first azimuth angle, said second and third heads having a second azimuth angle which is different from the first azimuth angle, said second head and said third head being mounted on said rotary drum to be opposed to each other at a central angle of 180 degrees, said first head being located in the immediate neighborhood of said third head in a direction along the circumference of said rotary drum with a minute difference in central angle, in record or reproduction at a data rate which is approximately one $M_1$-th a data rate which is a standard (where $M_1$ is a positive odd number), a recording or reproducing operation being conducted while said tape driving means drives the tape to run at a speed which is one $M_1$-th a reference tape speed, and said head control unit controls said first and second heads to alternately enter an operation state during one scan period for every $M_1/2$ revolutions of said rotary drum, and in record or reproduction at a data rate which is approximately one $M_2$-th a data rate which is a standard (where $M_2$ is a positive even number), a recording or reproducing operation being conducted while said tape drives means driving the tape to run at a speed which is one $M_2$-th a reference tape speed, and said head control unit controls said first and third heads to alternately enter an operation state during one scan period for every $M_2/2$ revolutions of said rotary drum, wherein said first and second heads have a mutual positional relationship in which there is a first minute height difference ΔH1 that is intentionally provided in the rotation shaft direction of said rotary drum, and said first and third heads have a mutual positional relationship in which there is a second minute height difference ΔH2 that is intentionally provided in the rotation shaft direction of said rotary drum.

8. A recording and reproducing apparatus comprising: tape driving means for driving a tape; a rotary drum around which the tape is to be slantly wound; and at least three heads including a first head, a second head, a third head which are mounted on said rotary drum and which scan the tape to conduct a recording or reproducing operation, and a head control unit, said first head having a first azimuth angle, said second and third heads having a second azimuth angle which is different from the first azimuth angle, said second head and said third head being mounted on said rotary drum to be opposed to each other at a central angle of 180 degrees, said first head being located in the immediate neighborhood of said third head in a direction along the circumference of said rotary drum with a minute difference in central angle, in record or reproduction at a data rate which is approximately one $M_1$-th a data rate which is a standard (where $M_1$ is a positive odd number), a recording or reproducing operation being conducted while said tape driving means drives the tape to run at a speed which is one $M_1$-th a reference tape speed, and said head control unit controls said first and second heads to alternately enter an operation state during one scan period for every $M_1/2$ revolutions of said rotary drum, and in record or reproduction at a data rate which is approximately one $M_2$-th a data rate which is a standard (where $M_2$ is a positive even number), a recording or reproducing operation being conducted while said tape drives means driving the tape to run at a speed which is one $M_2$-th a reference tape speed, and said head control unit controls said first and third heads to alternately enter an operation state during one scan period for every $M_2/2$ revolutions of said rotary drum, wherein said first and third heads have a mutual positional relationship in which said heads are at the same height in the rotation shaft direction of said rotary drum, and said first and second heads have a mutual positional relationship in which there is a minute height difference that is intentionally provided in the rotation of the shaft direction of said rotary drum.

\* \* \* \* \*